(12) United States Patent
Schoen et al.

(10) Patent No.: US 8,682,768 B1
(45) Date of Patent: Mar. 25, 2014

(54) MACHINE, ARTICLE, AND METHOD FOR AN INSTALLMENT PAYMENT PAYOUT AT CONTRACT VALUE

(71) Applicants: Matthew B. Schoen, Ojai, CA (US); Wayne F. Perg, Sierra Vista, AZ (US); John Andrew Pfleger, Delray Beach, FL (US)

(72) Inventors: Matthew B. Schoen, Ojai, CA (US); Wayne F. Perg, Sierra Vista, AZ (US); John Andrew Pfleger, Delray Beach, FL (US)

(73) Assignee: Concept Hedging, LLC, Miami, FL (US)

( * ) Notice: Subject to any disclaimer, the term of this patent is extended or adjusted under 35 U.S.C. 154(b) by 0 days.

(21) Appl. No.: 13/725,158

(22) Filed: Dec. 21, 2012

(51) Int. Cl.
*G06Q 40/00* (2012.01)

(52) U.S. Cl.
USPC ................................ 705/35; 705/36 R; 705/4

(58) Field of Classification Search
USPC .............................................. 705/4, 35, 36 R
See application file for complete search history.

(56) References Cited

U.S. PATENT DOCUMENTS

2012/0254045 A1* 10/2012 Orfano .......................... 705/306

* cited by examiner

*Primary Examiner* — James A Vezeris
(74) *Attorney, Agent, or Firm* — Peter K. Trzyna, Esq.

(57) ABSTRACT

A machine, article and method for an installment payment payout at contract value. A method can include: storing in memory terms of an agreement with a guarantor of a contract value for an investment, thus transforming a market value of the investment on a financial statement into a contract value, the terms including a payout of the contract value of the investment as installment payments over time, and that the installment payments will be determined in a manner to make their present value equal to the contract value, wherein the payments are discounted at market interest rates, and a specification that the payments are to be supported by a portfolio of securities to be held in a bankruptcy remote vehicle and by a payment guarantee of the guarantor and further including terms for determining a contract rate of return and a contract value.

93 Claims, 13 Drawing Sheets

MACHINE, ARTICLE, AND METHOD FOR AN INSTALLMENT PAYMENT PAYOUT AT CONTRACT VALUE

I. TECHNICAL FIELD

The technical field is process, machine, manufacture, pertaining to computer systems and data processing systems.

II. SUMMARY

Depending on the implementation, there is apparatus, a method for use and method for making, and corresponding products produced thereby, as well as data structures, computer-readable media tangibly embodying program instructions, manufactures, and necessary intermediates of the foregoing, each pertaining to digital processing aspects of data transformation with respect to such as: installment payment payout at contract value; adjustments to contract value; and/or management of accounting income with regard to the payment of death benefits.

III. BRIEF DESCRIPTION OF THE DRAWINGS

Figure 1:
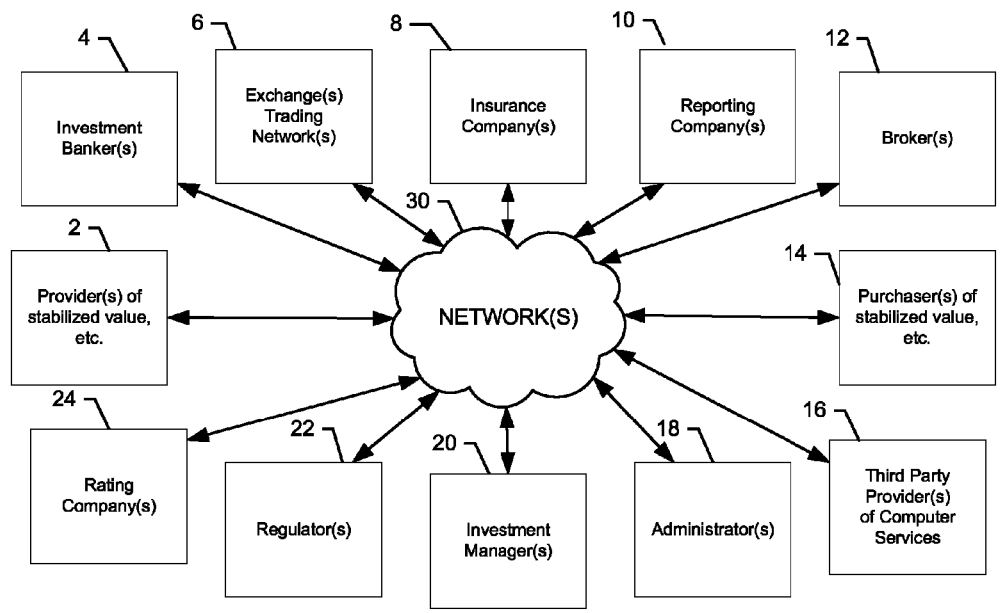
Figure 2:
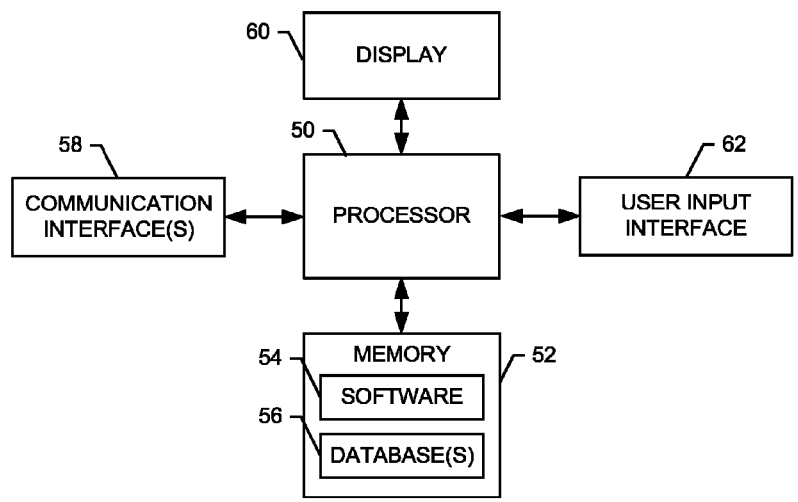
Figure 3:
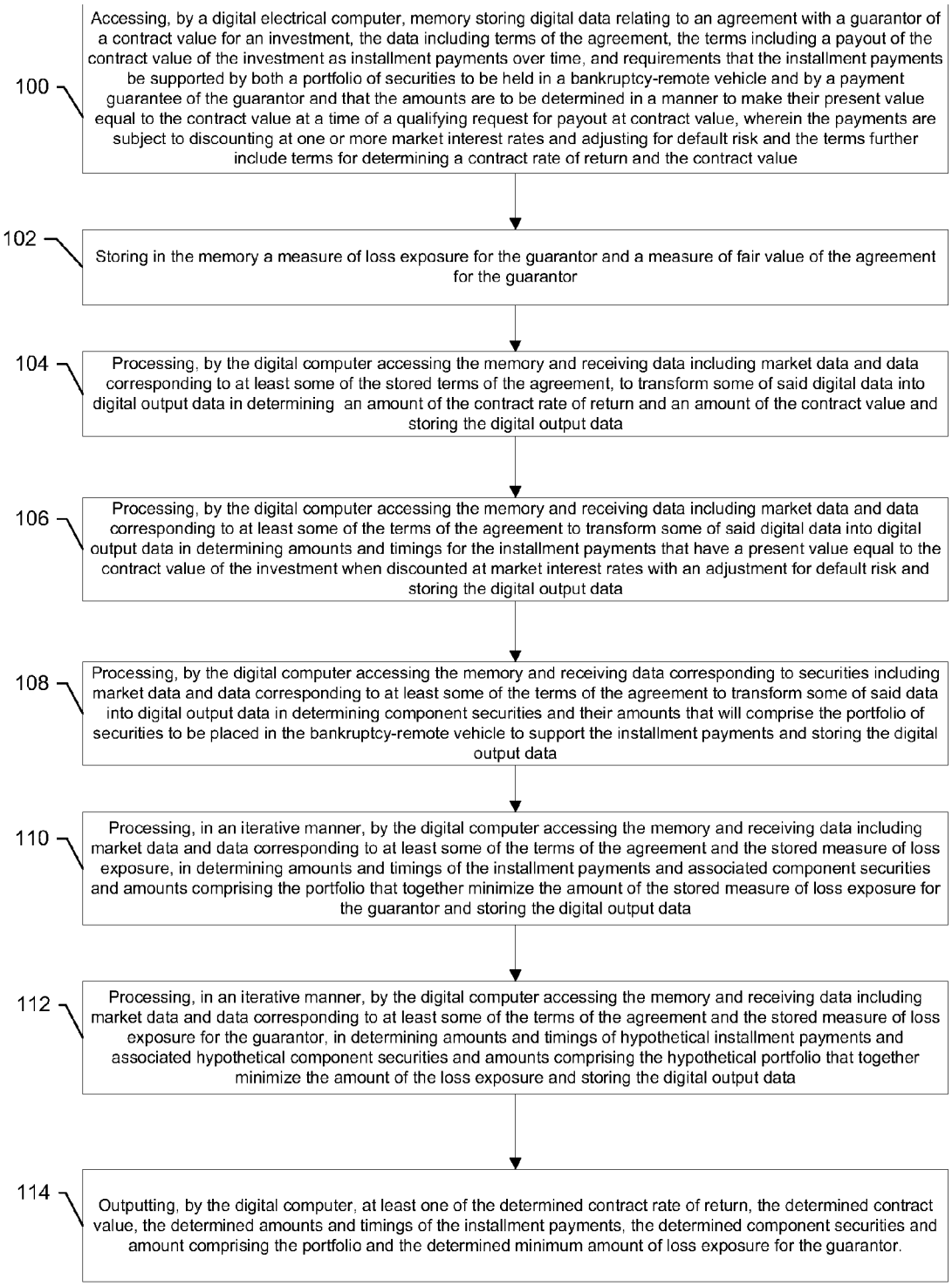
Figure 3A:
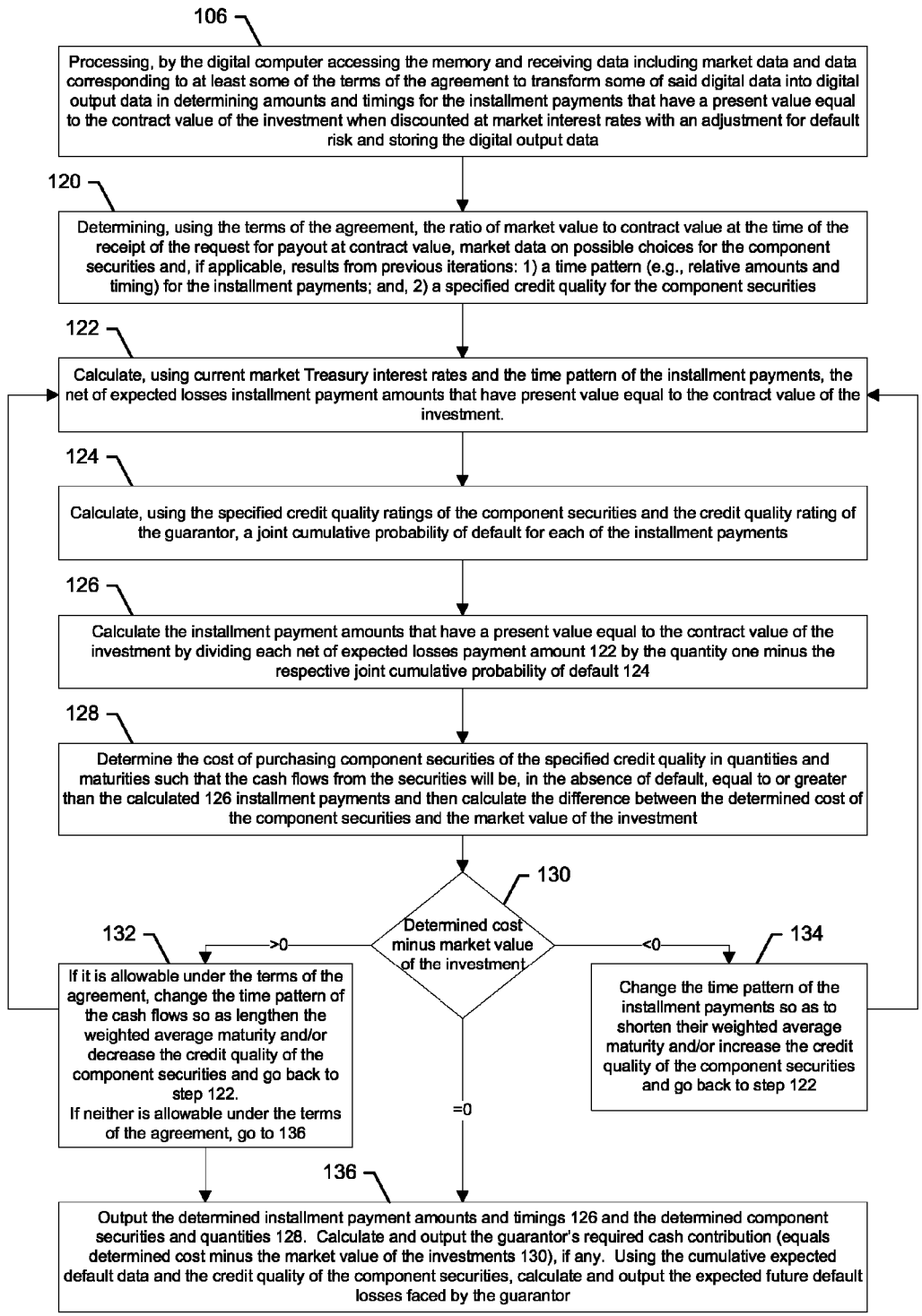
Figure 3B:
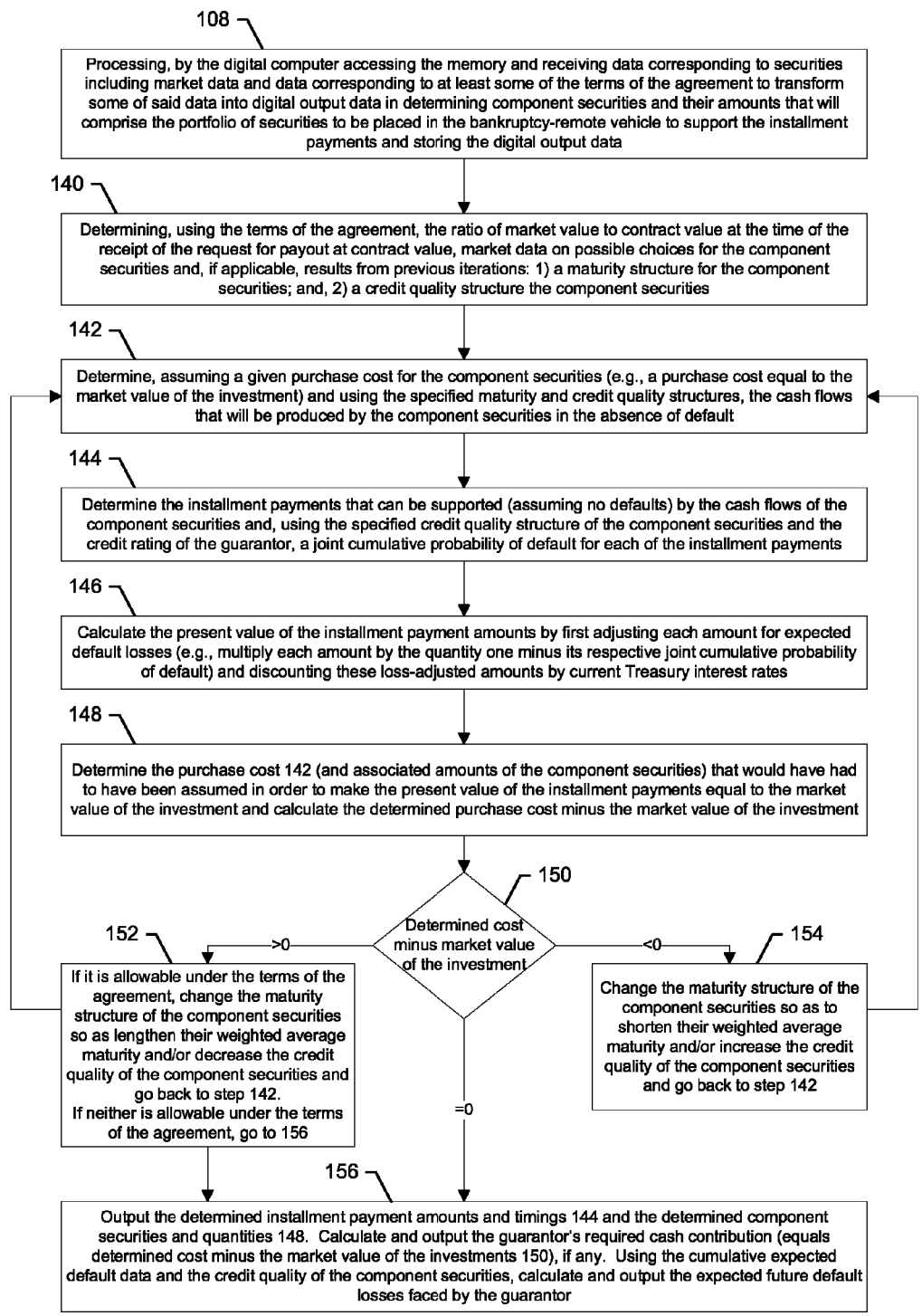
Figure 3C:
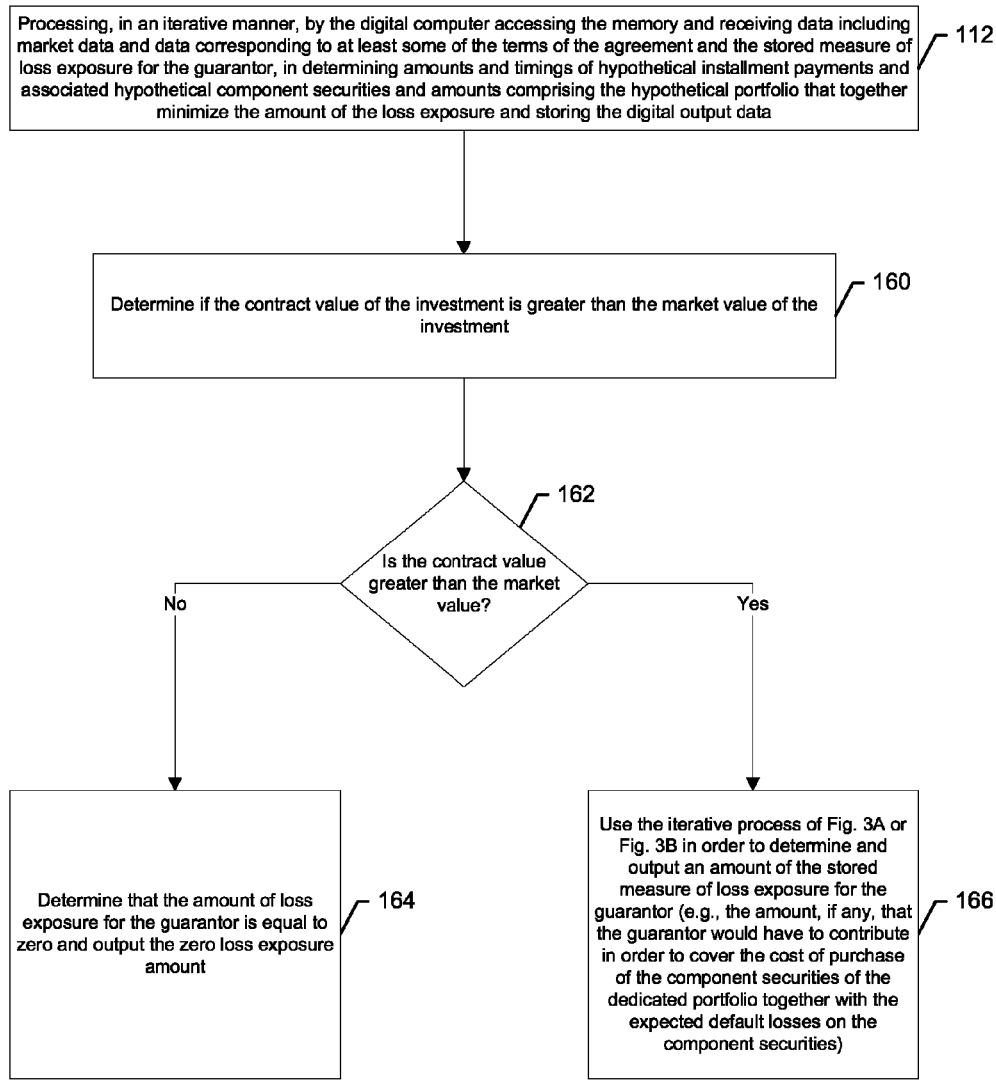
Figure 4:
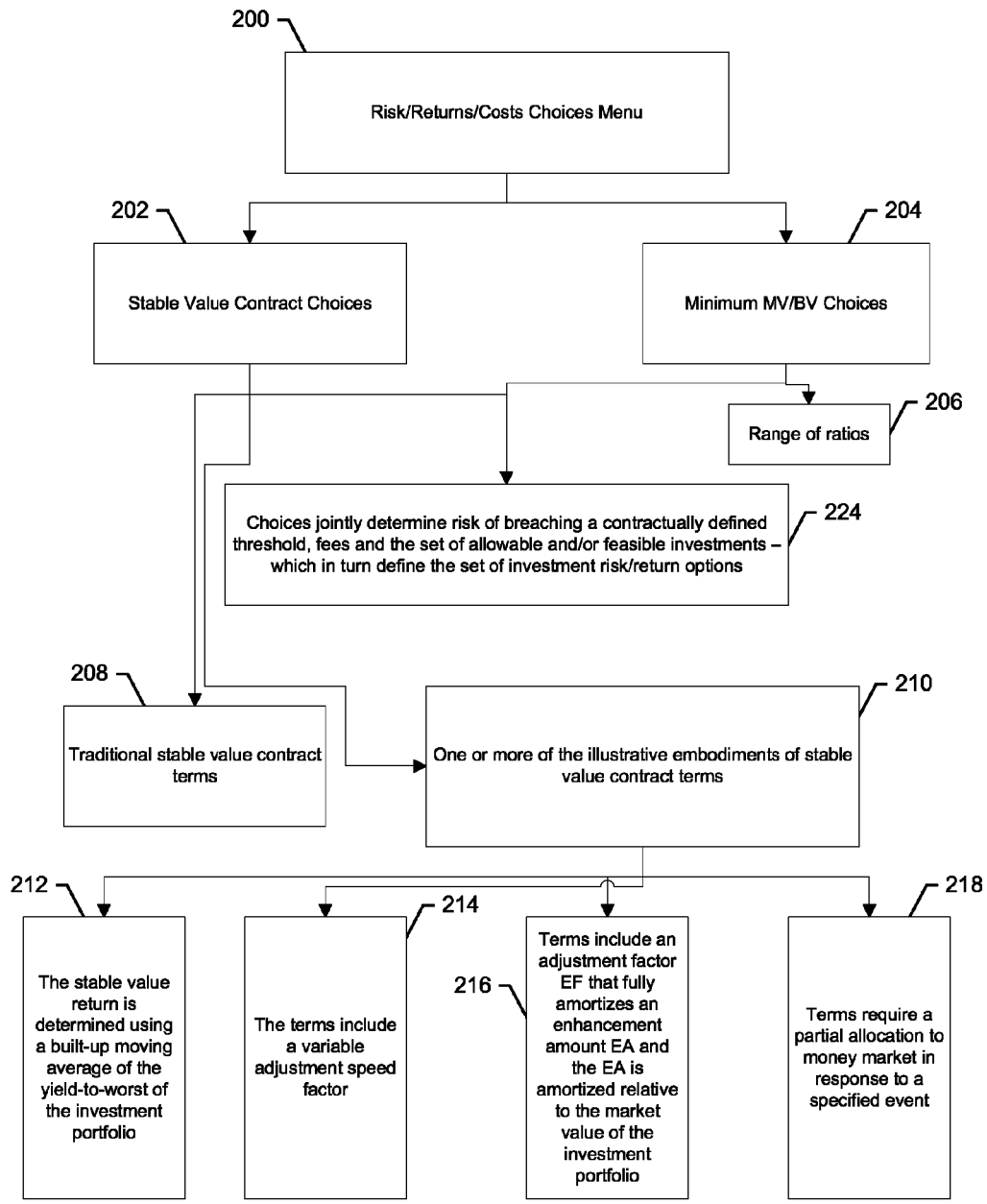
Figure 4A:
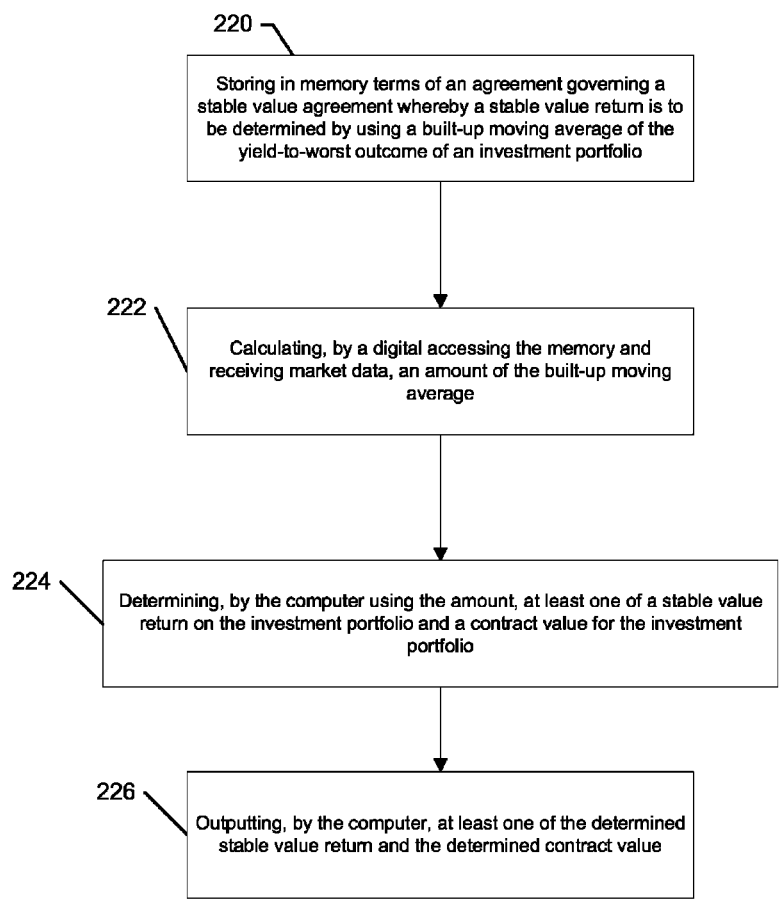
Figure 4B:
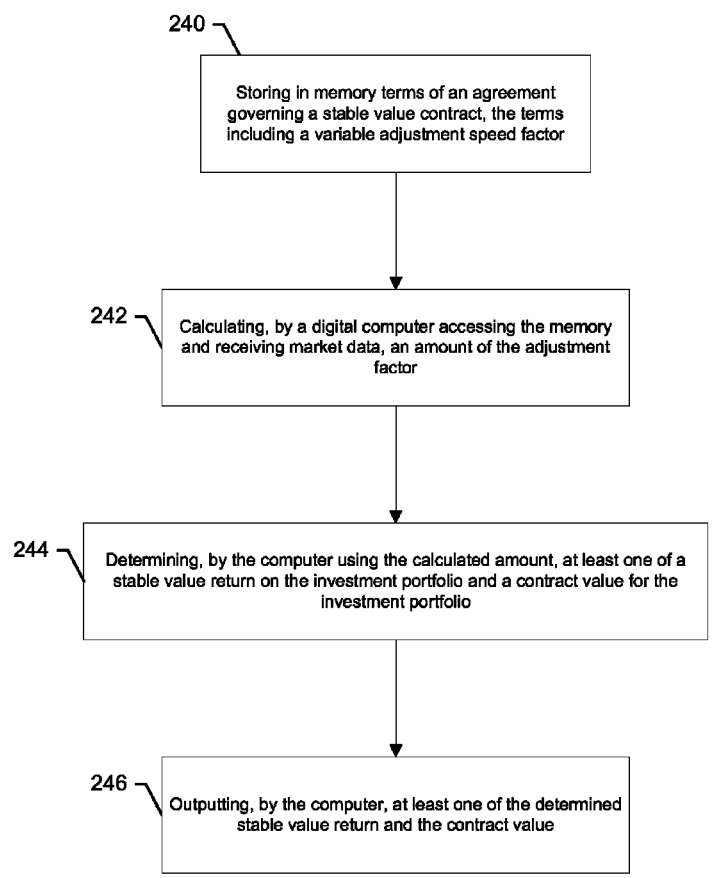
Figure 4C:
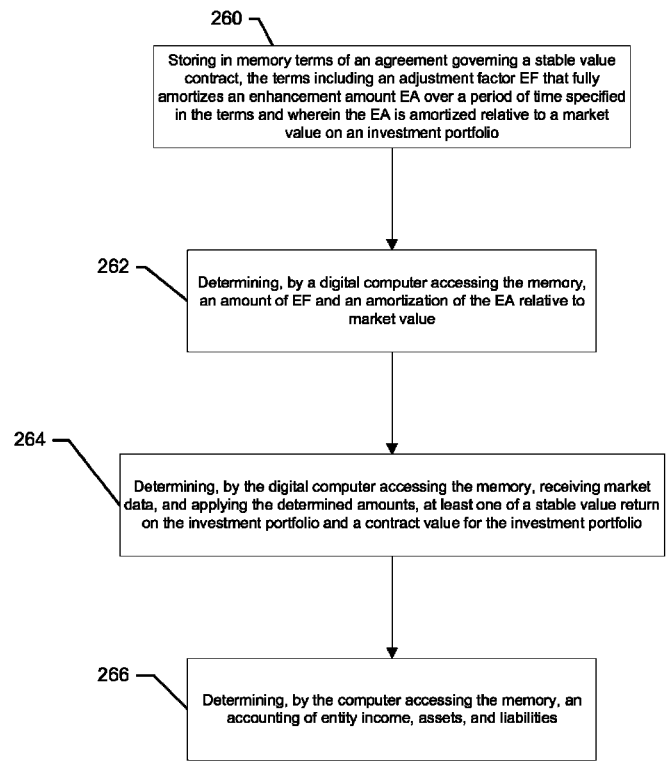
Figure 4D:
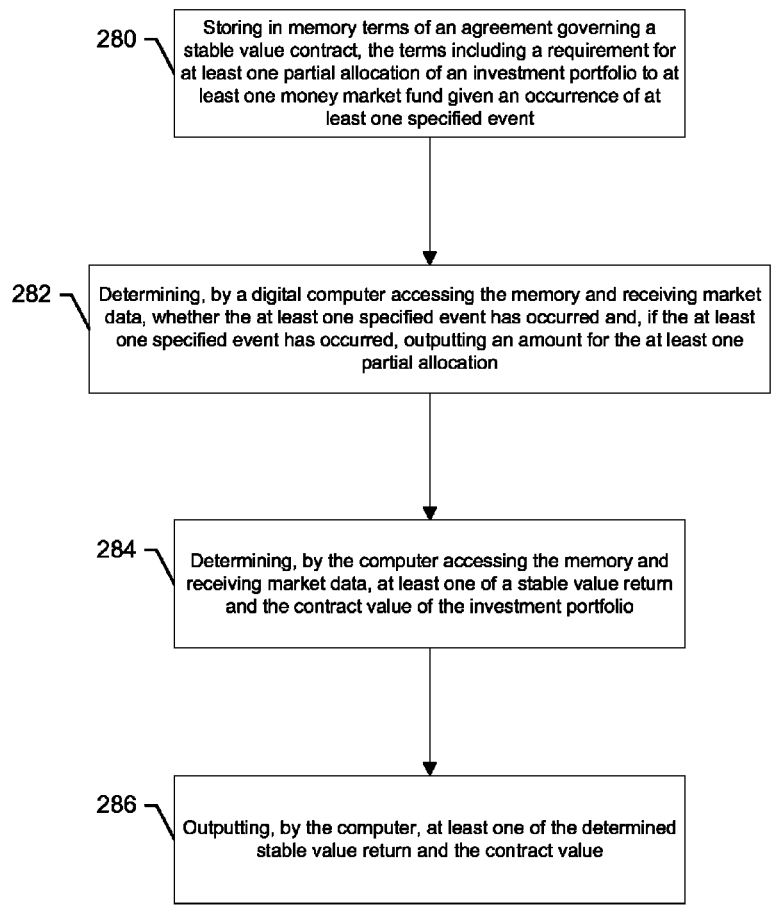
Figure 5:
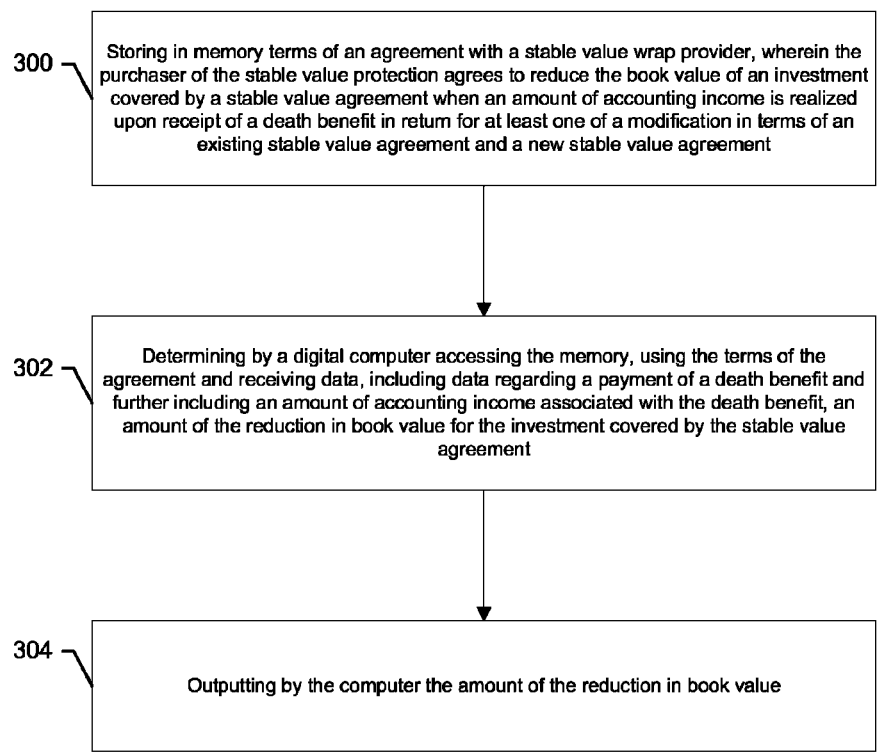
Figure 6:
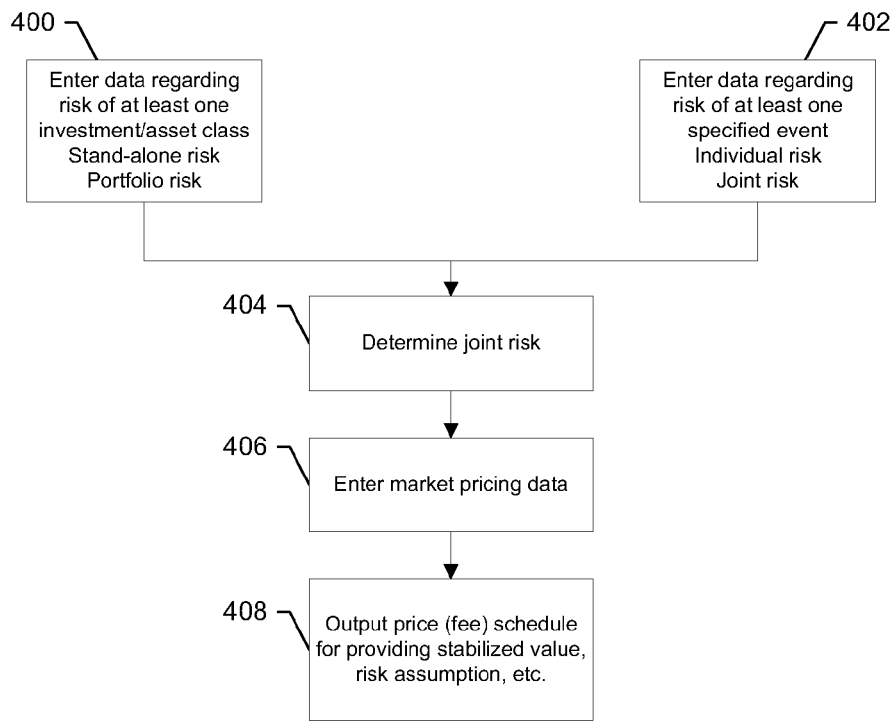
Figure 6A:
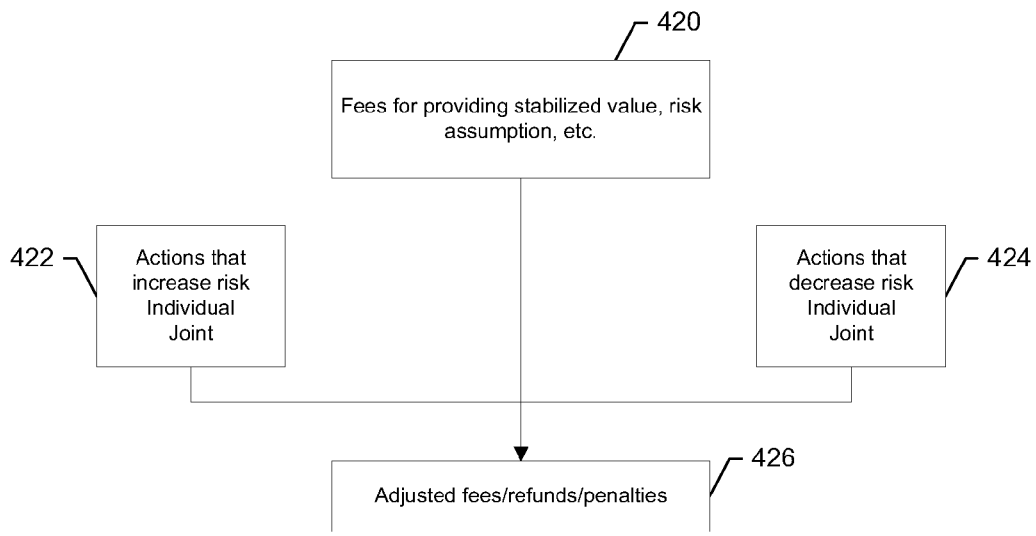
Figure 7:
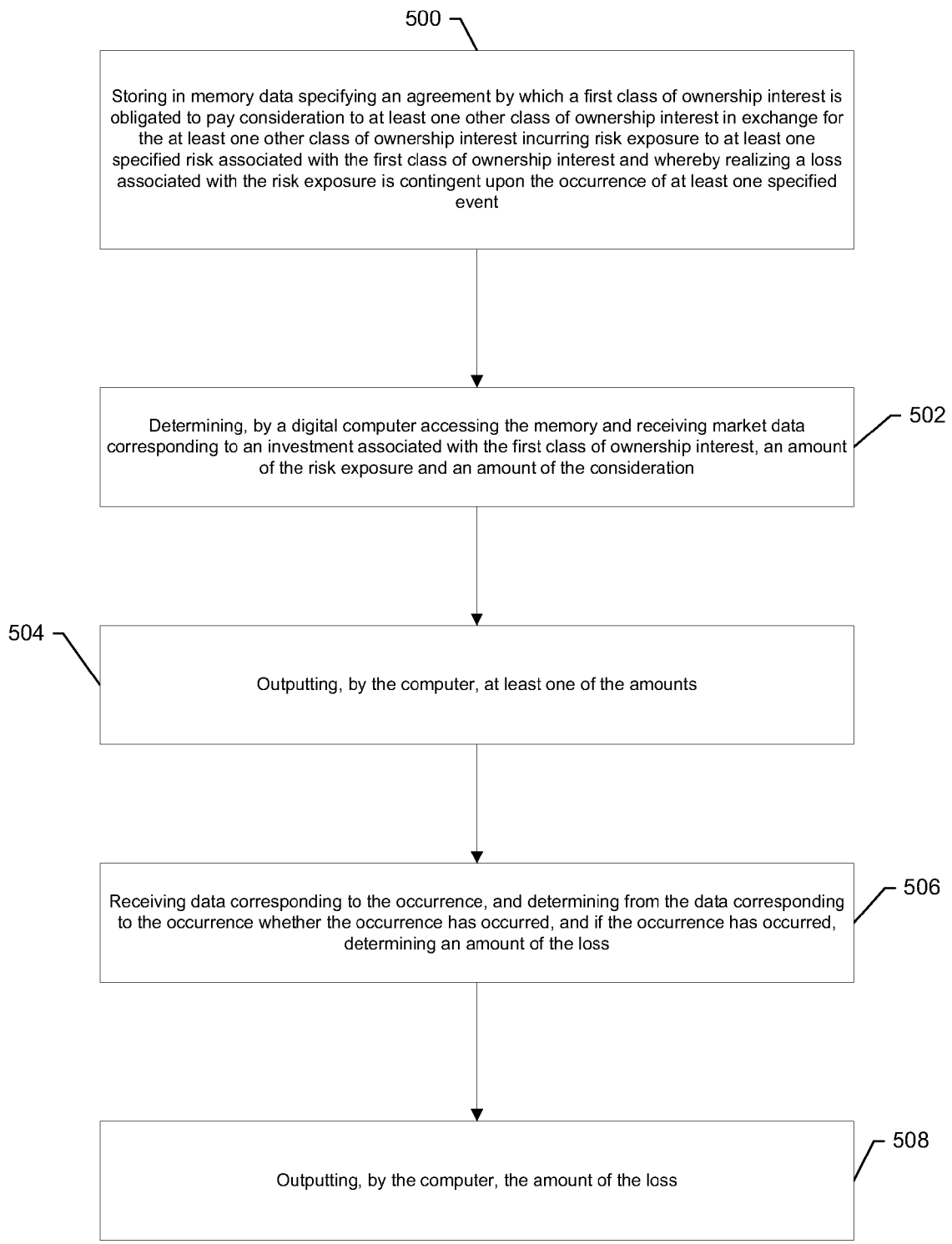

FIG. 1 is an illustration of a system according to an exemplary embodiment.
FIG. 2 is an illustration of an apparatus according to an exemplary embodiment.
FIG. 3 is a flow chart for another exemplary embodiment.
FIG. 3A is a flow chart for another exemplary embodiment
FIG. 3B is a flow chart for another exemplary embodiment
FIG. 3C is a flow chart for another exemplary embodiment
FIG. 4 is a flow chart for another exemplary embodiment.
FIG. 4A is a flow chart for another exemplary embodiment.
FIG. 4B is a flow chart for another exemplary embodiment.
FIG. 4C is a flow chart for another exemplary embodiment.
FIG. 4D is a flow chart for another exemplary embodiment.
FIG. 5 is a flow chart for another exemplary embodiment.
FIG. 6 is a flow chart for another exemplary embodiment.
FIG. 6A is a flow chart for another exemplary embodiment.
FIG. 7 is a flow chart for another exemplary embodiment.

IV. MODES

Embodiments are described hereinafter with reference to the accompanying figures. However, there are many different variations of these embodiments, and this description should not be construed as limited to the embodiments used to provide the overall teaching herefrom. Similarly, the accompanying figures illustrate embodiments intended to illustrate and exemplify in a teaching manner, by way of the prophetic teachings herein. Like numbers, in the text and figures, refer to like elements throughout.

Industrial applicability is representatively directed to computer control and implementation therefrom, as well as in computer networking, communications, transmission systems, receiver systems, and data processing and transformation and more, any and all of which are applicable to the computer science and electrical engineering industries, as well as industries operating in cooperation or connection therewith. Depending on the implementation, there is apparatus (machine), a method for use and method for making the apparatus, and corresponding products produced thereby (e.g., documentation, templates, interfaces, and other output), manufactures, as well as data structures, non-transient computer-readable media tangibly embodying program instructions, manufactures, and necessary intermediates (e.g., data, schema, computations, etc.) of the foregoing, which in turn correspond to digital aspects of embodiments indicated herein.

Illustratively, by way of a technical implementation, the following provides a more detailed discussion of products, machines, and processes implemented in machines are non-limiting examples of technical implementation. Generally, though, consider that a technical implementation can be directed to a machine configured to transform digital data into digital output data and disseminate the digital output data via a network to another machine, the output including a transformation of a market value for an investment into a contract value for the investment on a financial statement wherein the amount of the contract value is supported by installment payments that have been determined so as to have a present value, when discounted at market interest rates, that is equal to the amount of the contract value. In an exemplary embodiment, the machine can comprise a memory storing terms of an agreement with a guarantor of a contract value for the investment, the terms including a payout of the contract value of the investment as installment payments over time, a requirement (in the exemplary embodiment) that the installment payments will be determined in a manner to make their present value equal to the contract value of the investment, at a time of qualifying request for a payout of the contract value, wherein the payments are discounted at market interest rates, and a requirement (in the exemplary embodiment) that the payments are to be supported both by a portfolio of securities to be held in a bankruptcy-remote vehicle and by a payment guarantee of the guarantor. The component securities of the portfolio and the associated amounts and timings of the installment payments supported by the portfolio can be jointly determined in an iterative process that minimizes an amount of a stored measure of loss exposure for the guarantor. Once finalized, the scheduled amounts and timings of the installment payments supported by the portfolio can be comprised of substantially unequal payment amounts made at irregular intervals. The memory can be operably associated with a digital electrical computer, which can be hard wired or otherwise programmed (forming circuitry in at least one processor) to carry out certain operations. The operations can include, subsequent to the receipt of a qualifying, under the terms of the agreement, request for a contract value payout: accessing the memory device by the digital electrical computer; and, receiving by the digital electrical computer data including market data and using the terms of the agreement; and, processing some of said data to transform some of the data in determining amounts and timings for the installment payments that have a present value equal to the contract value of the investment when discounted at market interest rates with an adjustment for default risk, so as to transform a market value for the investment on a financial statement into a contract value; generating, by the digital electrical computer, digital output data comprising said amounts and timings for the installment payments; storing by the digital electrical computer, the digital output data in a database configured to store said digital output data; and, electrically disseminating, by the digital electrical computer, the digital output data via a network to another computer.

A "network" as described here can be a preconfigured network: like a local area network ("LAN") of computers, servers, and peripheral devices in a single office, or an ad hoc network caused by the temporary interconnection of computers over the Internet, by modem, via telephone, cable television, radio communication, combinations of these (like a telephone call made in response to a television solicitation), or otherwise to conduct a particular transaction. In the latter sense, the computers in the network do not need to all be linked up at once; as few as two of them can be linked at a time. The link can be a formal link or a casual link, as by sending e-mails or other communications from one computer to the other, or logging one computer into a web site maintained on another via the Internet.

As is conventional, the Internet connections or communication paths described above can be made in various ways. In one embodiment, the Internet connection can be enabled by a series of devices and transmission lines or paths including: a first computer, a modem connected to the first computer, a telephone (regular or DSL) or cable television transmission line or radio communication channel connected with or generated by a transmitter associated with the modem, a first Internet Service Provider (ISP) receiving the communication, the Internet, to which the first ISP is connected, a second ISP connected to the Internet, receiving the communication, a telephone or cable television transmission line or radio communication channel connected with or generated by the ISP, a modem connected to the second computer, and the second computer.

It will be understood that not all of the individual entities shown in FIG. 1 will necessarily communicate or deliver items by computer. Other means of communication and delivery, such as telephone communication, facsimile communication, hard copy delivery, or delivery of a DVD or CD containing data or programming for loading on a computer, are also contemplated in place of or in addition to one or more of the illustrated computer communication and delivery links shown in FIG. 1.

As used herein, the term "computer" generally refers to hardware or hardware in combination with one or more program(s), such as can be implemented in software. Computers can be implemented as general-purpose computers, specialized devices, or a combination of general-purpose and specialized computing devices. Computing devices can be implemented electrically, optically, quantumly, biologically, and/or mechanically or in any combination of these technologies. A computer as used herein can be viewed as at least one computer having all functionality or as multiple computers with functionality separated to collectively cooperate to bring about the functionality. This includes single processor and multi-processor implementations of a computer. A processor can include any device that processes information or executes instructions. Computer logic flow and operations can be used in processing devices, including but not limited to: signal processors, data processors, microprocessors, and communication processors. Logic flow can be implemented in discrete circuits, combinational logic, ASICs, FPGAs, reconfigurable logic, programmed computers, or an equivalent.

Computer-readable media or medium, as used herein, includes any technology that includes a characteristic of memory. Memory technologies can be implemented using magnetic, optical, mechanical, or biological characteristics of materials. Common examples of memory include, but are not limited to, RAM, ROM, PROM, EPROM, FPGA, flash drive(s), and floppy or hard disk(s). Communications medium or connection, as used herein, is any pathway or conduit in which information can be communicated or exchanged. The pathway or conduit can be wired, optical, fluidic, acoustic, wireless, or any combination of the foregoing.

The computer system can include one or more computers, which illustratively can be PC systems or server systems, and any combination of the foregoing. Depending on the implementation, computers can be adapted to communicate among themselves, or over a network such as the Internet. Programs, as used herein, are instructions that when executed by a processing device causes the processor to perform specified operations. Programs can be written in various languages, including but not limited to assembly, COBOL, FORTRAN, BASIC, C, C++, or Java. Languages can be object oriented like C++ and Java, for example. The programming language can be interpretive or compiled, or a combination of both. The programs are usually processed by a computing system having an operating system. An operating system can be processor specific, like an RTOS (real time operating system) used in cell phones, or commercial like OSX, UNIX, Windows, or LINUX. An operating system or program can be hardwired, firmware, reside in memory or be implemented in an FPGA or reconfigurable logic.

For example, a computer system can comprise a computer (e.g., an IBM™, Hewlett Packard™, MAC™, or other personal computer) with one or more processors (e.g., an Intel™ or AMD™ series processor or the like), a memory (e.g., RAM, a hard drive, disk drive, etc.), one or more input devices (e.g., keyboard, mouse, modem, or the like), and one or more output devices (e.g., a modem, a Hewlett Packard™ printer, a Dell™ monitor, or other such output device). Note that the modem is representative of a computer-to-computer communication device that can operate as an input/output device. To provide other illustrative embodiments, the computer system can comprise at least one of a desktop computer, a telephonic device, a console, a laptop computer, and a mobile communication device. The mobile communication device can comprise at least one of a cellular telephone, laptop, a PDA, and an IPhone-type device. Communications between devices may be wired, for example cabled Ethernet based home or office network, wireless through IEEE 802.11a/b/g network cards or Bluetooth™, or optical through an IR port. Networking between devices may be through WANs, LANs, Intranets, Internet or peer-to-peer arrangements, or in a combination of them. Networks may include, for example, gateways, routers, bridges, switches, front end and back end servers, IPS (Internet service providers), content provider servers, scanners, copiers, printers and user computing devices. Devices on the network may include interfaces that can be as simple, such as a keyboard with an LCD screen, or can be complex, such as a web interface. Web interfaces are presented in a web browser environment. Web browsers render XML or HTML containing pictures and links in a window on the desktop, for example like Windows XP™. Firefox™, Mozilla™, Internet Explorer™, and Safari™ are some examples of well known web browsers.

Consider now the figures illustrate so as to teach the broader principles at play.

Referring to FIG. 1, entities (spread out or consolidated in one way or another as may be preferred in any given application) which can cooperate in a digital manner to carry out terms of an agreement. As an overview, particulars can be implemented in a variety of different configurations, so as to carry out the agreement of interest so as to implement improvements to insurance, financial products and assets including at least one of the desired costs, accounting treatment, asset classification, risk management, capital treatment and/or ownership (henceforth "desired accounting treatment, etc."). A configuration such as that in FIG. 1, illustrative of corresponding computers, includes one or more providers of stabilized value, etc. 2, purchasers of stabilized value, etc. 14 (policyholders and/or protection buyers), insurance companies 8, investment managers 20, investment bankers 4, exchanges and/or trading networks for securities 6, reporting companies 10 (e.g., Bloomberg, Reuters, etc.), brokers 12 (e.g., securities brokers, insurance brokers, etc.), rating companies 24 (e.g., Standard & Poor, Moody's, Fitch, A. M. Best, etc.), regulators 22 (e.g., SEC, state insurance commissioners, etc.), administrators 18 (e.g., of partnerships or other entities), and/or third party providers of computer services 16 (including so-called "cloud computing" in which the programs and/or data reside on the web).

Each provider of stabilized value, etc. 2 is digitally configured to directly and/or indirectly communicate with one or more purchasers of stabilized value, etc. 14 (policy holders and/or protection buyers), insurance companies 8, investment managers 20, investment bankers 4, exchanges and/or trading networks for securities 6, reporting companies 10, brokers 12, rating companies 24, regulators 22, administrators 18, and/or third party providers of computer services 16.

Similarly, each purchaser of stabilized value, etc. 14 is digitally configured to directly and/or indirectly communicate with one or more providers of stabilized value, etc. 2, insurance companies 8, investment managers 20, investment bankers 4, exchanges and/or trading networks for securities 6, reporting companies 10, brokers 12, rating companies 24, regulators 22, administrators 18, and/or third party providers of computer services 16.

Each insurance company 8 is digitally configured to directly and/or indirectly communicate with one or more providers of stabilized value, etc. 2, purchasers of stabilized value, etc. 14, investment managers 20, investment bankers 4, exchanges and/or trading networks for securities 6, reporting companies 10, brokers 12, rating companies 24, regulators 22, administrators 18, and/or third party providers of computer services 16.

Each investment manager 20 is digitally configured to directly and/or indirectly communicate with one or more providers of stabilized value, etc. 2, purchasers of stabilized value, etc. 14, insurance companies 8, investment bankers 4, exchanges and/or trading networks for securities 6, reporting companies 10, brokers 12, rating companies 24, regulators 22, administrators 18, and/or third party providers of computer services 16.

Each investment banker 4 is digitally configured to directly and/or indirectly communicate with one or more providers of stabilized value, etc. 2, purchasers of stabilized value, etc. 14, investment managers 20, insurance companies 8, exchanges and/or trading networks for securities 6, reporting companies 10, brokers 12, rating companies 24, regulators 22, administrators 18, and/or third party providers of computer services 16.

Each exchange and/or trading network 6 is digitally configured to directly and/or indirectly communicate with one or more providers of stabilized value, etc. 2, purchasers of stabilized value, etc. 14, investment managers 20, investment bankers 4, insurance companies 8, reporting companies 10, brokers 12, rating companies 24, regulators 22, administrators 18, and/or third party providers of computer services 16.

Each reporting company 10 is digitally configured to directly and/or indirectly communicate with one or more providers of stabilized value, etc. 2, purchasers of stabilized value, etc. 14, investment managers 20, investment bankers 4, exchanges and/or trading networks for securities 6, insurance companies 8, brokers 12, rating companies 24, regulators 22, administrators 18, and/or third party providers of computer services 16.

Each broker 12 is digitally configured to directly and/or indirectly communicate with one or more providers of stabilized value, etc. 2, purchasers of stabilized value, etc. 14, investment managers 20, investment bankers 4, exchanges and/or trading networks for securities 6, reporting companies 10, insurance companies 8, rating companies 24, regulators 22, administrators 18, and/or third party providers of computer services 16.

Each rating company 24 is digitally configured to directly and/or indirectly communicate with one or more providers of stabilized value, etc. 2, purchasers of stabilized value, etc. 14, investment managers 20, investment bankers 4, exchanges and/or trading networks for securities 6, reporting companies 10, brokers 12, insurance companies 8, regulators 22, administrators 18, and/or third party providers of computer services 16.

Each regulator is digitally configured to directly and/or indirectly communicate with one or more providers of stabilized value, etc. 2, purchasers of stabilized value, etc. 14, investment managers 20, investment bankers 4, exchanges and/or trading networks for securities 6, reporting companies 10, brokers 12, rating companies 24, insurance companies 8, administrators 18, and/or third party providers of computer services 16.

Each administrator 18 is digitally configured to directly and/or indirectly communicate with one or more providers of stabilized value, etc. 2, purchasers of stabilized value, etc. 14, investment managers 20, investment bankers 4, exchanges and/or trading networks for securities 6, reporting companies 10, brokers 12, rating companies 24, regulators 22, insurance companies 8, and/or third party providers of computer services 16.

Each third party provider of computer services 16 is digitally configured to directly and/or indirectly communicate with one or more providers of the guarantee which achieves stabilized value, earnings or income, and in some cases achieving a desired accounting treatment, etc. 2, purchasers of the guarantee resulting in stabilized value, earnings or income and in some cases achieving a desired accounting treatment, etc. 14, investment managers 20, investment bankers 4, exchanges and/or trading networks for securities 6, reporting companies 10, brokers 12, rating companies 24, regulators 22, administrators 18, and/or insurance companies 8. The providers of the guarantee resulting in stabilized value, earnings or income and achieving a desired accounting treatment, etc. 2, purchasers of the guarantee resulting in stabilized value, earnings or income and achieving a desired accounting treatment, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can be configured to directly and/or indirectly communicate with one another across one or more networks 30. The network(s) can comprise any of a number of different combinations of one or more different types of networks, including data and/or voice networks. For example, the network(s) can include one or more data networks, such as a local area network (LAN), a metropolitan area network (MAN), and/or a wide area network (WAN) (e.g., the Internet), and include one or more voice networks, such as a public-switched telephone network (PSTN). Although not shown, the network(s) may include one or more switches, routers and/or other components for relaying data, information or the like between the providers of stabilized value, etc. 2, purchasers of stabilized value, etc. 14, insurance companies 8, investment managers 20, investment bankers 4, exchanges and/or trading networks for securities 6, reporting companies 10, brokers 12, rating companies 24, regulators 22, administrators 18, and/or third party providers of computer services 16.

The providers of stabilized value, etc. 2, purchasers of stabilized value, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise any one or more of a number of different apparatuses, devices or the like configured to operate in accordance with embodiments herein. In this regard, one or more of the providers of stabilized value, etc. 2, purchasers of stabilized value, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise, include or be embodied in one or more processing apparatuses, such as one or more of a laptop computer, desktop computer, server computer or the like.

Additionally or alternatively, one or more of the providers of stabilized value, etc. 2, purchasers of stabilized value, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise, include or be embodied in one or more portable electronic devices, such as one or more of a mobile telephone, portable digital assistant (PDA), pager or the like. For example, the providers of stabilized value, etc. 2, purchasers of stabilized value, etc. 14, insurance companies 8, investment managers 20, investment bankers 4, exchanges and/or trading networks for securities 6, reporting companies 10, brokers 12, rating companies 24, regulators 22, administrators 18, and/or third party providers of computer services 16 can each comprise a processing apparatus (e.g., a computer) configured to communicate with one another across the Internet (e.g., network 30).

It should be understood, however, that one or more of the providers of stabilized value, etc. 2, purchasers of stabilized value, etc. (policyholders and/or protection buyers) 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise or otherwise be associated with a user carrying out the functions of the respective apparatus. For example, the provider of stabilized value, etc. 2 can comprise a provider of stabilized value, etc. user (provider of stabilized value, etc. or another operator under direction of the provider of stabilized value, etc.) communicating across a PSTN (e.g., network 30) or in person with a purchaser of stabilized value, etc. 14 user (purchaser of stabilized value, etc. or another operator under direction of the purchaser of stabilized value, etc.) operating one or more purchaser of stabilized value, etc. processing apparatuses, where the purchaser of stabilized value, etc. user and processing apparatus(es) collectively comprise the purchaser of stabilized value, etc. Similarly, for example, the provider of stabilized value, etc. can comprise a provider of stabilized value, etc. user communicating across a PSTN or in person with an insurance company user (insurance company or another operator under direction of the insurance company operating one or more insurance company processing apparatuses, where the insurance company user and processing apparatus(es) collectively comprise the insurance company. Similarly for each entity depicted in FIG. 1 with respect to each other entity depicted in FIG. 1.

As explained below, then, the term "provider of stabilized value, etc." can refer to a provider of stabilized value, etc. including a provider of stabilized value, etc. user and/or one or more provider of stabilized value, etc. processing apparatuses. Similarly, a "purchaser of stabilized value, etc." can refer to a purchaser of stabilized value, etc. including a purchaser of stabilized value, etc. user and/or one or more purchaser of stabilized value, etc. processing apparatuses. And an "insurance company" can refer to an insurance company user and/or one or more insurance company processing apparatuses. Similarly for each entity depicted in FIG. 1.

Referring now to FIG. 2, a block diagram of a processing apparatus (e.g., computer in a system) that may be configured to operate as is shown in accordance with exemplary embodiments herein. Although shown as separate entities, in some embodiments, one or more processing apparatuses may support one or more of a providers of stabilized value, etc. 2, purchasers of stabilized value, etc. 14, insurance companies 8, investment managers 20, investment bankers 4, exchanges and/or trading networks for securities 6, reporting companies 10, brokers 12, rating companies 24, regulators 22, administrators 18, or third party providers of computer services 16, logically separated but co-located within the entity(ies). For example, a single processing apparatus may support a logically separate, but co-located life insurance company and investment manager processing apparatus.

The processing apparatus that may be configured to operate for each entity depicted in FIG. 1 includes various means for performing one or more functions in accordance with exemplary embodiments herein, including those more particularly shown and described herein. It should be understood, however, that one or more of the apparatuses may include alternative means for performing one or more like functions, without departing from the spirit and scope of that which is overall presented herein. More particularly, for example, as shown in FIG. 2, the apparatus can include a processor 50 connected to a memory 52. The memory 52 can comprise volatile and/or non-volatile memory, and typically stores content, data or the like. In this regard, the memory 52 may store software applications 54, instructions or the like for the processor to perform steps associated with operation of the apparatus in accordance with embodiments herein. The memory 52 may also store content transmitted from, and/or received by, the apparatus, such as in one or more databases 56. As described herein, the software application(s) may each comprise software operated by the respective entities. It should be understood, however, that any one or more of the software applications described herein can alternatively be implemented in firmware and/or hardware, without departing from the spirit and scope of that which is presented herein.

In addition to the memory 52, the processor 50 can also be connected to at least one interface, e.g., including an output device, or other means for displaying, printing, transmitting and/or receiving data, content or the like. In this regard, the interface(s) can include at least one communication interface 58 or other means for transmitting and/or receiving data, content or the like. In addition to the communication interface(s), the interface(s) can also include at least one user interface that can include one or more earphones and/or speakers, a display 60, and/or a user input interface 62. The user input interface, in turn, can comprise any of a number of devices allowing the apparatus to receive data from a user, such as a microphone, a keypad, a touch display, a joystick, or other input device.

According to one aspect, all or a portion of the system, including association with one or more entities depicted in FIG. 1, generally operates under control of a computer program product. The computer program product for performing the methods of embodiments includes a computer-readable storage medium, such as the non-volatile storage medium, and computer-readable program code portions, such as a series of computer instructions, embodied in the computer-readable storage medium.

FIG. 3 is a flow chart of a method of using a machine in transforming digital data into digital output data to permit use of a contract value (also referred to as a book value) in place of a market value on a financial statement—thus providing stabilized value—and outputting the digital data in a manner that can: 1) significantly reduces the risk exposure for the guarantor of the contract value (the provider of stabilized value); and, as result; 2) significantly decrease the cost, and increase the availability of, stabilized value.

The technical implementation of FIG. 3 can be a computer system having a memory storing terms of the agreement with a guarantor of a contract value for an investment and a computer processor programmed for reading the terms of the agreement and receiving data including market data. When a qualifying (under the terms of the agreement) request for a payout at contract value is received, the computer processor can determine amounts and timings of installment payments that have a present value equal to the contract value of the investment.

Another technical implementation of FIG. 3 is a method for digitally implementing the agreement with the guarantor of a contract value for an investment. The method can include several steps. One step is providing the following apparatus (machine): a digital computer comprising a processor for receiving the input data, processing the input data to produce output data, and outputting the output data; a memory operatively connected to or associated with the processor for storing and retrieving machine-readable data input to and output from the processor, and a program operatively connected to the processor to form circuitry in the processor for controlling the processor to receive the input data and to produce and store in the memory the output data. Another step is inputting data to the processor identifying the market value of an investment. A further step is using the processor to determine a transformation of the market value of the investment on a financial statement into a contract value (also known as a book value) for the investment on the financial statement and, upon receipt of a qualifying request for a payout at contract (book) value, determining amounts and timings of installment payments that have a present value equal to the contract value of the investment, wherein the payments are discounted at market interest rates and further determining component securities and amounts for a portfolio of securities to be placed in a bankruptcy-remote vehicle and wherein the installment payments are supported both by the portfolio of securities and by a payment guarantee of the guarantor.

The method of FIG. 3 can reduce the risk exposure for guarantor of the contract value of the investment by: 1) significantly reducing the probability that the purchaser of stabilized value for the investment will request a payout at contract value at a time when the market value of the investment is less than the contract value of the investment; and, 2) significantly reducing, and perhaps even largely eliminating, the expected loss suffered by the guarantor in the event that the purchaser of stabilized value for the investment should request a payout at contract value at a time when the market value of the investment is less than the contract value of the investment.

In order to provide context for these two points, note that the goal of the purchaser of stabilized value is to achieve this desired stabilized value accounting treatment (e.g., accounting for the investment on the purchaser's financial statements at a stabilized contract, or book, value rather than at a volatile market value) at as low of a cost as is possible. However, the contract (between the purchaser of stabilized value and the provider of stabilized value (the guarantor, or wrap provider) creates a risk of loss for the provider of stabilized value (the guarantor, or wrap provider) in the event that the purchaser of stabilized value should make a qualifying request for payout at contract (book) value at a time when the market value of the investment is less than the contract (book) value.

Minimizing the cost of stabilized value requires minimizing the risk of loss for the provider of stabilized value (the guarantor or wrap provider) because providers of stabilized value will enter the market only if the fee that they receive (i.e., the cost of stabilized value) is sufficiently large to earn them a profit and to compensate them for the risk that they are assuming as providers of stabilized value.

The risk of loss exists because the volatile market value of the investment will inevitably, at times, fall below the stabilized contract (book) value, thus creating the possibility that the purchaser of stabilized value for the investment will request a payout of the contract value of the investment at a time when market value is less than contract value and thereby creating a loss for the provider of stabilized value (the guarantor, or wrap provider) when the investment is sold for less than the amount (the contract value) to be paid out. This risk of loss for the provider of stabilized value can be reduced three primary ways: 1) reducing the probability that purchaser of stabilized value will choose to request a payout at contract value at a time when the market value of the investment is less than the contract (book) value of the investment; 2) making it possible for the guarantor to recover a portion (and, even, in some cases, all) of the shortfall of market value of the investment relative to contract (book) value that exists at the time of the request for payout at contract value; and, 3) modifying the process by which contract rates of return (also known as stable value returns) and contract (book) values are determined, thus reducing the frequency and/or the amounts by which the contract value exceeds the market value of the investment.

The embodiment illustrated in FIG. 3 shows a method of using an apparatus (machine) that employs both the first and the second of these three primary ways to reduce the risk of loss for the provider of stabilized value for the investment (the guarantor or wrap provider)—and, therefore, to reduce the cost of stabilized value for the purchaser of stabilized value for the investment.

The probability that the purchaser of stabilized value for the investment will request a payout at contract value at a time when the market value is less than the contract value is reduced by the use of an installment payment payout that spreads the payout of the contract value of the investment over a number of years. Spreading the payout of the contract value over a number of years using the installment payment payout method makes it more difficult for the purchaser of stabilized value for the investment to take advantage of the provider of stabilized value (the guarantor or wrap provider) by, in effect, "putting" the investment to the provider of stabilized value at an above-market price (the contract value) and then using the cash received from the exercise of the put to buy back the investment (or a similar investment) at the lower market price because "putting" the investment to the provider of stabilized value at the contract value yields only future payments rather than the cash needed to buy back the investment (or a similar investment) at the lower market price In the event that the purchaser of stabilized value for the investment is subject to regulatory capital requirements, it may be possible to further reduce the risk that the purchaser of stabilized value may request a payout at contract value at a time when the market value of the investment is less than the contract value. This possibility can arise because the installment payments in the installment payment payout at contract value are backed by a portfolio of securities chosen by the guarantor (and held in a bankruptcy-remote vehicle) as well as by the guarantee of the guarantor. If the terms of the agreement allow the guarantor to consider the capital requirement impacts (on the capital requirements of the purchaser of stabilized value for the investment) in choosing the component securities of the portfolio, the purchaser of stabilized value (contract value) for the investment might be further deterred from requesting payment at contract value at a time when the market value of the investment is less than contract value as the result of concern that the guarantor will select some component securities for the portfolio with a high cost of regulatory capital. For example, if the purchaser of stabilized value (contract value) for the investment is a regulated bank, risk capital requirements for banks could, in some cases, result in very high (relative to investments of similar risk) risk capital requirements for certain types of securities, including certain asset backed securities, mortgages, corporate bonds, certain mortgage-backed securities in which the issuer of the securities is not a GSE (Government-Sponsored Entity) such as Fannie Mae or Freddie Mac. If the bank regulatory risk capital requirements in effect at time of surrender impose punitive risk capital levels with certain classes of securities or assets, and the guarantor has a degree of discretion over the inclusion or exclusion of such classes of securities or assets, then a bank that is considering an installment payment payout at contract value might be deterred from electing such payout option by the unknown, but potentially penalizing risk capital requirements (i.e., that could result if the guarantor should choose to include some of these high risk capital-cost securities or assets in the portfolio backing the installment payments).

In addition, another feature of the method illustrated in FIG. 3 makes it possible for the provider of stabilized value for the investment (the guarantor or wrap provider) to recover, over the time period of the installment payment payout, a portion (and, even, in some cases, all) of the shortfall of market value of the investment relative to contract (book) value that exists at the time of the request for payout at contract value. In the embodiment the terms of the agreement include (emphasis added) a payout of the contract value of the investment as installment payments over time, a requirement that the installment payments will be determined in a manner to make their present value equal to the contract value of the investment, at a time of qualifying request for payout of the contract value, wherein the payments are discounted at market interest rates and a requirement (in an exemplary embodiment) that the payments are to be supported by both a portfolio of securities to be held in a bankruptcy-remote vehicle and by a payment guarantee of the guarantor.

Because the payments are supported both by a portfolio of securities and by a payment guarantee of the guarantor, it is possible for the guarantor (as a result of assuming the risk of guaranteeing the payments from the portfolio of securities, thus transforming the risk of default on the installment payments into a joint probability of default that is much lower than the probability of default of either the portfolio or the guarantor) to specify a portfolio of securities that can earn a "spread" over the market interest rates that are used to discount the installment payments, after being adjusted for default risk as determined by the joint probability of default, to a present value equal to the contract value. As a result of the ability to lock in this "spread", the guarantor is able to, over the time period of the installment payments and in the absence of defaults on the component securities of the portfolio, earn back a portion—or even all—of the shortfall of market value relative to contract value.

The longer the time period of the installment payments, the more time that is available for the guarantor to earn (assuming no defaults of the component securities) this spread and the greater the possible reduction in the guarantor's loss. However, the longer the time period, the greater the probability of default on the component securities of the portfolio and the greater the risk that the guarantor will have to make good on its payment guarantee (i.e., and, in so doing, incur a loss commensurate with the net amount of the defaulted security(ies)). Therefore, lengthening the time period for the installment payments can reduce, but not eliminate, the risk exposure for the guarantor (the provider of stabilized value for the investment or wrap provider). In addition, the terms of the agreement can include a limit on the maximum term (e.g., ten years) for the installment payment payout.

Similarly, the guarantor can increase the "spread" earned (in the absence of default on the component securities of the portfolio) by investing the portfolio in component securities with a lower credit quality (e.g., lower rated bonds) and, therefore, a higher interest rate, thus making it possible to earn back (in the absence of default on the component securities) a larger portion of the shortfall of market value to contract value over a given period of time. However, the lower the credit quality of the component securities, the greater the probability of default on the component securities of the portfolio and the greater the risk that the guarantor will have to make good on its payment guarantee (i.e., and, in so doing, incur a loss commensurate with the net amount of the defaulted security(ies)).

Therefore, reducing the credit quality of the component securities can—up to a point—reduce but not eliminate, the risk exposure for the guarantor (the provider of stabilized value or wrap provider). In addition, the terms of the agreement can include a limit on the minimum credit quality of the component securities (e.g., not less than investment grade).

Other embodiments presented herein (see FIG. 4A, FIG. 4B, FIG. 4C and FIG. 4D) can reduce risk by the third primary method: modifying the process by which the contract rate of return (also known as the crediting rate and the stable value return) and contract (book) value are determined, thus reducing the frequency and/or the amounts by which the contract value of the investment exceeds the market value of the investment. Yet another embodiment presented herein (see FIG. 5) illustrates an embodiment by which some purchasers of stabilized value for the investment can manage realized (accounting) gains from life insurance death benefits so as to both further stabilize (accounting) income and to further reduce risk for the provider of stabilized value for the investment (the guarantor or wrap provider) and, thereby, further reduce the cost of stabilized value for the investment and/or obtain more favorable terms than can allow the purchaser to take actions that can increase the realized return on the investment.

In the installment payment payout embodiment, the investment specified in the stored terms of the agreement can be a life insurance policy, the qualifying request for a payout at contract value can be a qualifying, under the terms of the agreement, surrender of the insurance policy, the bankruptcy-remote vehicle can be a separate account of an insurance company, the payout at contract value can be a payout of a cash surrender value of the policy by the insurance company as installment payments, and the requirement can be that the installment payments will be determined in a manner to make their present value equal to the policy cash surrender value at the time of the qualifying surrender.

The embodiment can include storing terms for determining a contract rate of return (a crediting rate or stable value return) and a contract (book) value, receiving data including market data associated with the stored terms and using the stored terms in determining an amount of the contract (stable value) return and an amount of contract (book) value and outputting at least one of the amounts. Or the embodiment can include receiving an amount for the contract rate of return and/or an amount for the contract value, storing the amount(s) and using the amount(s) in determining amounts and timings for the installment payments.

The stored terms for determining the contract rate of return can include terms specifying a minimum allowable ratio of the market value of the investment to the contract value of the investment, calculating an amount of difference between a ratio of the market value to the contract value and the minimum allowable ratio and using the amount of the difference in determining the amount of the contract rate of return.

The embodiment can include storing terms including at least one requirement regarding characteristics of component securities of the portfolio, receiving and storing securities data, identifying, from the stored securities data, each of the component securities and their respective amounts for portfolio, and storing and outputting each of the identities of the component securities their respective amounts. The identifying can further include identifying the component securities and their amounts that provide, in the absence of default, a set of cash flows equal to or greater than the determined installment payment amounts.

The embodiment can further include determining the present value of the installment payment amounts by adjusting the amounts of the installment payments for defaults using the joint cumulative probability of default of the portfolio of securities and of the guarantor and then discounting these default-risk adjusted amounts by one or more market Treasury rates. For example, each installment payment can be reduced by the amount of the expected default loss using the cumulative joint probability of default applicable to the payment. Each of the default-risk adjusted installment payment amounts can then be discounted by a respective current market Treasury interest rate (e.g., each default-risk adjusted payment amount can be discounted by a zero-coupon Treasury interest rate of the same maturity as the installment payment). Alternatively, all of the default-risk adjusted payment amounts can be discounted by a single Treasury interest rate (e.g., the interest rate for Treasuries that have the same duration as the default-risk adjusted installment payments).

In this regard, both the accounting profession and finance professionals recognize the use of two alternative methodologies for determining the present value of future cash flows: 1) discounting the (unadjusted) amounts by a risk-adjusted market rate (or rates) of interest; and, 2) first adjusting the amounts for default risk and then discounting these (risk-adjusted) amounts by market Treasury rates. The accounting profession notes that the second method is not required but it is also allowed. The embodiment can use either method. However, the second method enables a more precise accounting for the risk of default associated with the joint probability of default which in turn makes possible a more accurate assessment of the benefits (reduced risk for the provider of stabilized value and reduced cost for the purchaser of stabilized value) that are, in part, created by the role of the joint probability of default in the functioning of the embodiment. For this reason the second method of determining present value is the preferred method in the embodiment.

A preferred variation of the embodiment is the variation in which the terms of the agreement require the installment payments to be fully backed by the cash flows (assuming no defaults) of the component securities of the portfolio as well as being fully guaranteed by the guarantor. In this preferred variation, one hundred percent of the installment payments are adjusted for default risk using the joint cumulative probability of default and the guarantor is required to make a cash contribution to the purchase of the component securities if the market value of the investment is less than the purchase cost of the component securities (i.e., the guarantor's required cash contribution to the purchase of the component securities of the portfolio equals the cost of the component securities minus the realized (upon sale) market value of the investment). All of the following discussion of the embodiment assumes this preferred variation.

In a further variation of the embodiment, the guarantor of the contract value can choose to specify a portfolio which can, in the absence of default, generate cash flows in excess of the amounts of the determined installment payment amounts. Specifying a portfolio that can, in the absence of defaults, generate cash flows in excess of the determined installment payment amounts can reduce the future default risk exposure of the guarantor as the guarantor is responsible only for the installment payment amounts and this over-collateralization of the installment payment amounts can cover some portion of any defaults on the component securities of the portfolio without triggering a required payment by the guarantor. In addition, this over-collateralization can, by its ability to reduce default risk relative to the installment payment amounts, have the ability to reduce the determined amounts of the installment payments. The cost of this over-collateralization to the guarantor can be the need to contribute more cash to the initial purchase cost of the portfolio.

However, the embodiment is not limited to this preferred variation. In another variation of the embodiment, the guarantor is not required to make a cash contribution to the purchase of the component securities even in the case where the realized (upon sale) market value of the investment is less than the cost of the component securities. In this other variation of the embodiment, not all of the installment payment amounts will be backed by the cash flows (assuming no defaults) of the component securities of the portfolio—i.e., there will be some portion of one or more installment payments that will be backed only by the guarantee of the guarantor. Therefore, in this other variation of the embodiment, some portion of one or more installment payments may be adjusted for default using only the cumulative probability of default for the guarantor rather than by using the joint cumulative probability of default.

The embodiment can further include determining the joint cumulative probability of default using: 1) credit spreads; 2) credit default swap pricing; and/or, 3) historical default rates. Although any of the three (and any combination of the three) may be used to determine the joint cumulative probabilities of default, there is both theoretical and empirical evidence that supports the use of historical default rates. In addition, the use of historical default rates can support clear contractual terms for the agreement in which published credit agency rating data is used to determine the cumulative joint probabilities of default in a specified manner.

The embodiment can yet further include the use of an iterative process to determine the amounts and timings of the installment payments and the determining of the component securities of the portfolio and their amounts, wherein the iterative process is used to minimize a stored measure of loss exposure for the guarantor (provider of stabilized value for the investment). In this iterative process the amounts and timings of the installment payments and the component securities and their amounts are jointly determined. However, the form of the process can differ somewhat depending on whether the starting point is the determination of the amounts and timings of the installment payments (see FIG. 3A) or if the starting point is the determination of the component securities and their amounts (see FIG. 3B).

Any specified form of a loss measure for the guarantor can be stored and minimized. Variables that may be included in the loss measure include, but are not limited to: 1) the amount of cash that the guarantor contributes to the purchase of the portfolio—i.e., the excess, if any, of the cost of the component securities over the (realized) market value of the investment); and, 2) the expected default losses on the component securities of the portfolio (which losses must, by the payment guarantee of the guarantor be made up by the guarantor).

In one form of the loss measure, the loss measure is minimized by a two-step process of: 1) minimizing, or eliminating, any required (in an exemplary embodiment) cash contribution by the guarantor to the purchase of the component securities of the portfolio—given the contractual constraints on the maximum period for the installment payments and the minimum allowable credit quality for the component securities; and then, 2) subject to the constraint of the first minimization (or elimination), minimizing the expected default losses on the component securities by reducing the weighted average maturity of the installment payments and/or increasing the credit quality of the component securities in a manner so as to minimize expected default losses (subject to maintaining the minimum, or elimination, of the guarantor's required (in an exemplary embodiment) cash contribution to the purchase of the securities composing the portfolio determined in step 1). Risk simulations performed by the Applicant indicate that if the market value to contract value ratio is 90.0% at the time of a qualifying request for payout at contract value, the maximum allowable term of the installment payments is 10 years, and the spread of investment grade bond returns over Treasuries is no less than 1.5%, then (assuming cumulative joint probabilities of default consistent with current historical norms) a AA rated guarantor may be able to minimize, by a material amount, the required (in an exemplary embodiment) cash contribution to the purchase of the component securities of the portfolio. However, the guarantor will remain at risk for any defaults on the component securities over the period of the installment payments.

In another form of the loss measure, a regulatory capital requirement for the guarantor can be incorporated in the determination of the amount of the loss measure. In yet another, a cost of capital for the guarantor can be incorporated into the determination of the amount of the loss measure. For example, expected future loss exposures (e.g., expected future defaults on the component securities of the portfolio) can be discounted at the cost of capital for the guarantor, thus determining a present value for the expected future loss amounts. Or a cost of capital for the guarantor (possibly, in the case of a regulatory capital requirement, a cost of equity capital) can be applied to a determined increase in regulatory capital associated with the risk exposure, thus determining a cost of the required increase in regulatory capital.

In yet another form of loss measure, the amount of loss to be minimized by the iterative process is equal to the sum of: 1) the amount of the required (in an exemplary embodiment) cash contribution by the guarantor to the purchase of the component securities; and, 2) the present value of the expected future default losses on the component securities of the portfolio. In a variation of this form of the loss measure, the present value of the expected future default losses on the component securities is calculated using the cost of capital of the guarantor. In another variation of this form, terms are stored for determining one or more interest rates for discounting the expected default losses on the component securities and the determined one or more interest rates are used to discount the expected default losses in order to determine their present value. Alternatively, the one or more interest rates used to discount the expected default losses are received and stored. The one or more interest rates that are received and stored to be used for discounting the expected default losses can the cost of capital of the guarantor. There is no requirement that the guarantor must use the same methodology for determining the expected losses for the purpose of calculating the loss measure as was used in determining (according to the terms of the agreement) the joint cumulative probabilities of default that were used to adjust the installment payment amounts for default risk before discounting these adjusted amounts at market Treasury interest rates. For example, a guarantor that is also engaged in investment management might choose to use loss estimates compiled by its investment managers in computing the loss measure rather than the historical loss rates used in adjusting the installment payments for default risk.

The embodiment can further include determining an amount of loss exposure for the guarantor (see FIG. 3C) wherein the determining can include the use of an iterative process of determining amounts and timings of the (hypothetical) installment payments and the (hypothetical) component securities and amounts that minimize the stored measure of loss exposure for the guarantor. In this case the amounts and timings of the installment payments and the component securities and their amounts are hypothetical because the determining occurs in order to determine the amount of the loss exposure rather than in response to a request for a payout of contract value. Because there is no request for a payout of contract value, there are no actual amounts and timings of installment payments to be determined and no actual component securities and their amounts to be determined. However, in the event that the market value of the investment is currently less than the contract value, the amount of the loss exposure can be determined by an iterative process that determines respective hypothetical amounts, timings and composition in the process of determining the amount of loss exposure for the guarantor. Said determining of the amount of loss exposure can occur periodically and/or upon request (e.g., to determine targeted or mandatory, i.e., regulatory, reserve levels, risk capital amounts, etc.).

The embodiment can include determining a notional amount of the agreement for the guarantor. It can further include determining an amount of notional liability for the guarantor. The amount of notional liability can in some instances differ from the notional amount of the agreement. For example, if the agreement includes a hard cap on the loss exposure of the guarantor of, for example, a ratio of market value of the investment to the contract value of the investment of 90.0%, then the notional amount of the agreement can be the current amount of the contract value and the notional liability of the guarantor can be 10.0% of the current contract value of the investment. In the event that an installment payment payout at contract value has occurred, the embodiment can include determining a notional amount value of the remaining installment payment amounts.

The embodiment can further include storing a measure of fair value of the agreement for the guarantor wherein the determining of the amount of the fair value includes determining of hypothetical amounts and timings of the component securities of the portfolio and hypothetical amounts and timings of installment payments using an iterative process in the hypothetical determining that minimizes one or more amounts of hypothetical loss exposure using the stored measure of loss exposure. The determining, storing and outputting of the amount of fair value can occur on a periodic basis, upon request, and/or upon occurrence of at least one specified event.

The determining of the amount of fair value can further include storing a measure of probability of receiving a qualifying request for payout at contract value, determining an amount of the probability of a qualifying request for payout at contract value, and using the amount of the probability in determining the amount of fair value. The determining of the amount of fair value can further include receiving and storing a regulatory capital requirement of the purchaser of stabilized value for the investment and wherein the amount of fair value of the agreement for the guarantor is to reflect an impact of the stored regulatory capital requirement on the probability that the purchaser will make a qualifying request for payout at contract value. In this regard, the terms of the agreement can permit the guarantor to use regulatory requirements of beneficiary (i.e., the purchaser of stabilized value for the investment) as a factor in identifying component securities of the portfolio and the determining of the component securities and their respective amounts can include determining a regulatory capital requirement of the securities that are candidates for selection as the component securities of the portfolio.

The stored terms of the agreement can include preferences or requirements for minimum amounts of call protection for the component securities, the identifying of the component securities can include identifying component securities with call protection equal to or greater than the preferred or required minimum amounts of call protection, and the determining can include determining actual amounts of call protection associated with securities that are candidates considered for selection as the component securities of the portfolio.

A preference or requirement regarding call protection for the component securities of the portfolio can reduce risk for both the purchaser of stabilized value and for the provider of stabilized value for the investment. In the preferred embodiment, the cash flows from the component securities can (in the absence of default) fully fund the installment payments. However, if interest rates should fall during the period of the installment payment payout, one or more of the component securities of the portfolio may be called at par (plus a possible call premium). In the absence of sufficient call protection, the funds received from the called securities can be insufficient to purchase replacement securities in sufficient amounts so as to allow the portfolio to continue to fully fund (in the absence of defaults) the remaining installment payments. Given the risk that inadequate call protection can create for the guarantor (the guarantor being liable for any shortfall of funds from the portfolio caused by calls of component securities), the guarantor may choose to include a call protection preference or requirement in the identifying of the component securities even if such a preference or requirement is not included in the agreement.

The determining of fair value can further include receiving and storing the identity of a beneficiary of the agreement (e.g., the purchaser of stabilized value for the investment), determining, by using tax preparation software, a tax liability for the beneficiary (purchaser of stabilized value for the investment) in the event of a qualifying request for the installment payout at the contract value, and determining a probability of the qualifying request for the installment payment payout at the contract value by using the determined amount of tax liability of the beneficiary upon the installment payment payout at the contract value.

The embodiment can still further include the use of a measure of the variation in the return on the investment, wherein the amount of the measure of variation changes over time, in determining the amount of the contract value and/or the contract rate of return. For example, a measure of the variation of the rate of return on the investment might be defined to be the standard deviation of the rate of return on the investment calculated over a specified period of time (e.g., over the last 12 months). In the event that the contract rate of return is determined by a process that includes a variable speed of adjustment, the amount of the measure of the variation in the return on the investment can be included as a factor in determining the adjustment speed. In this regard, U.S. application Ser. No. 13/346/677 and U.S. Pat. Nos. 8,095,448 and 7,774,256 are included by reference as if fully restated herein.

The embodiment can further include a determining wherein the guarantor is a superstructure pool. A superstructure pool is a pool of guarantors that has been formed to assume an obligation or risk that is financial liability over time. In the installment payment embodiment, the obligation is an obligation to pay out in installments payments the contract value of the investment upon receipt of a qualifying request for payout at contract value, wherein the installment payment amounts and timing are determined to have a present value equal to the contract value. The operations of the pool are governed by rules for member participation in the pool, which are stored in a computer system and wherein the computer system applies the rules to carry out the step of determining the participation in the pool within the period of time. The determining of participation can include determining changing responsibility for the financial liability of the pool and determining changing membership in the pool, thus ensuring the ongoing strength of the guarantee provided by the pool and, therefore, preserving stabilized value for the investment. In this regard, U.S. Application No. 10,784,719 is included by reference as if fully restated herein.

The embodiment can still further include storing terms of the agreement which include an option (depending on the agreement, exercising the option may or may not require the assent of the recipient of the installment payments) for the guarantor to prepay any remaining installment payments at their amortized cost, the determining further including determining an amount of the amortized cost and the outputting further including outputting the amount of the amortized cost. The amortization of the installment payments can be determined at the time that the amounts and timings of the installment payments are determined by determining a rate of interest that makes the present value of the installment payments equal to the contract value of the investment and then using the rate of interest to determine the amortization of the installment payments.

The option for the guarantor to prepay any remaining installment payments at their amortized cost can, in the event that interest rates fall sufficiently during the period of the installment payment payout (and if the guarantor has identified securities with adequate call protection), allow the guarantor to possibly eliminate any remaining default risk exposure (resulting from the guarantor's guarantee of the installment payments funded by the portfolio) by selling the component securities of the portfolio and using the proceeds to prepay the remaining installment payments at their amortized cost.

The embodiment can yet further determine minimum preferred or required amounts of call protection for the component securities of the portfolio—e.g., amounts of call protection that are sufficient to protect the guarantor from loss in the event that interest rates should fall during the period of the installment payments and, as a result, some or all of the component securities are called at the call prices of the securities. In the absence of sufficient call protection, calls of component securities could leave the guarantor with insufficient cash from the called securities to purchase replacement securities in the amounts required to fund the remaining installment payments. However, given sufficient (i.e., at least the minimum preferred or required amounts) call protection, as determined herein by the embodiment, falling interest rates during the period of the installment payments can benefit the guarantor because, if interest rates should fall sufficiently, the prices of the component securities will rise (in the absence of defaults and/or downgrades and given the determined amounts of call protection) to equal or exceed the amortized cost of the remaining installment payments and the guarantor will be able to sell off the component securities of the proceeds and receive sufficient funds to pay off all of the remaining installment payments at amortized cost, thus eliminating any risk of future losses due to the default of component securities.

In the event that the guarantor has contributed funds to the purchase of the component securities of the portfolio, the embodiment can still further determine amounts of call protection for the component securities that may make it possible—in the event that interest rates fall far enough and quickly enough during the installment payment period and the component securities are not subject to defaults and/or downgrades—for the guarantor to sell the securities of the portfolio for an amount sufficient to both pay off the remaining installment payments at amortized cost and to recoup some or all of the funds that the guarantor contributed to the purchase of the component securities of the portfolio.

Although it is common for corporate bonds to be callable at par (or a call price only slightly above par) after a specified time period, increased amounts of call protection can be achieved by purchasing bonds that are selling at a discount (i.e., below par or face value). Given market data on the bond including the remaining time, if any, before the bond can be called, the call price of the bond, the market price of the bond and the coupon interest payments of the bond, the amount of call protection associated with the bond can be determined. If the market value of the investment has been driven below contract value by rising interest rates, then discount bonds should be widely available at the time that the amounts and timings of the installment payments are determined together with the component securities of the portfolio.

The determining of a minimum amount of loss exposure for the guarantor can further include receiving and storing terms of at least one agreement between the guarantor and at least one insurer regarding an amount of insurance against the default risk, wherein the default risk includes the default risk of the portfolio or one or more component securities of the portfolio; receiving and storing data including market data corresponding to at least some terms of the stored at least one agreement between the guarantor and said at least one insurer; determining an amount at least one amount of insurance to be purchased from each said insurer and a cost of said insurance, and wherein said at least one amount of the insurance is used in the iterative processing which produces the minimization of the measure of the loss exposure; and storing and outputting the at least one amount of the insurance to be purchased and the cost of said insurance. The insurance may be in the form of a credit default swap wherein the insurer is the counterparty in the credit default swap, the amount of the insurance is the notional amount of the credit default swap and the cost of the insurance is the cost of the credit default swap.

FIG. 3 is a flow chart of a method using an apparatus (machine) for transforming a market value of an investment on a financial statement into a contract (book) value in a manner that can significantly reduce the risk for the provider of stabilized value (the guarantor of the contract value) and, therefore, significantly reduce the cost of purchasing stabilized value for the investment. The exemplary embodiment presented in FIG. 3 (and in FIG. 3A, FIG. 3B and FIG. 3C) may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

Accessing 100, by a digital electrical computer, memory storing digital data relating to an agreement with a guarantor of a contract value for an investment, the data including terms of the agreement, the terms including a payout of the contract value of the investment as installment payments over time, and requirements (in an exemplary embodiment) that the installment payments be supported by both a portfolio of securities to be held in a bankruptcy-remote vehicle and by a payment guarantee of the guarantor and that the amounts are to be determined in a manner to make their present value equal to the contract value at a time of a qualifying request for payout at contract value, wherein the payments are subject to discounting at one or more market interest rates and adjusting for default risk and the terms further include terms for determining a contract rate of return and the contract value.

Storing 102 in the memory a measure of loss exposure for the guarantor and a measure of fair value of the agreement for the guarantor.

Processing 104, by the digital computer accessing the memory and receiving data including market data and data corresponding to at least some of the stored terms of the agreement, to transform some of said digital data into digital output data in determining an amount of the contract rate of return and an amount of the contract value and storing the digital output data.

Processing 106, by the digital computer accessing the memory and receiving data including market data and data corresponding to at least some of the terms of the agreement to transform some of said digital data into digital output data in determining amounts and timings for the installment payments that have a present value equal to the contract value of the investment when discounted at market interest rates with an adjustment for default risk and storing the digital output data Processing 108, by the digital computer accessing the memory and receiving data corresponding to securities including market data and data corresponding to at least some of the terms of the agreement to transform some of said data into digital output data in determining component securities and their amounts that will comprise the portfolio of securities to be placed in the bankruptcy-remote vehicle to support the installment payments and storing the digital output data.

Processing 110, in an iterative manner, by the digital computer accessing the memory and receiving data including market data and data corresponding to at least some of the terms of the agreement and the stored measure of loss exposure, in determining amounts and timings of the installment payments and associated component securities and amounts comprising the portfolio that together minimize the amount of the stored measure of loss exposure for the guarantor and storing the digital output data.

Processing 112, in an iterative manner, by the digital computer accessing the memory and receiving data including market data and data corresponding to at least some of the terms of the agreement and the stored measure of loss exposure for the guarantor, in determining amounts and timings of hypothetical installment payments and associated hypothetical component securities and amounts comprising the hypothetical portfolio that together minimize the amount of the loss exposure and storing the digital output data Outputting 114, by the digital computer, at least one of the determined contract rate of return, the determined contract value, the determined amounts and timings of the installment payments, the determined component securities and amount comprising the portfolio, and the determined minimum amount of loss exposure for the guarantor.

FIG. 3A expands on the determining 106 of the amounts and timings of the installment payments that have a present value equal to the contract value of the investment and illustrates one form of an iterative process 110 for jointly determining amounts and timings of the installment payments and component securities and amounts that minimize a measure of loss exposure for the guarantee—in this case a form of the iterative process that begins with the determination of the amounts and timings of the installment payments. Steps 120-136 illustrate a process for determining amounts and timings of installment payments that have a present value equal to the contract value of the investment. Steps 120-136 illustrate an iterative process for minimizing a measure of loss exposure for the guarantor wherein the process begins with the determination of amounts and timings of the installment payments. In the variation of the embodiment illustrated in FIG. 3A, the measure of the loss exposure for the guarantor that is minimized is the expected default losses on the component securities (which must, by the terms of the payment guarantee, be made up by the guarantor) subject to the constraint of minimizing or eliminating the required (in an exemplary embodiment) cash contribution by the guarantor toward the purchase of the component securities of the portfolio and wherein the cash flows from the component securities are required (in an exemplary embodiment) to be sufficient, in the absence of default, to fund the installment payments.

Determining 120, using the terms of the agreement, the ratio of market value to contract value at the time of the receipt of the request for payout at contract value, market data on possible choices for the component securities and, if applicable, results from previous iterations: 1) a time pattern (e.g., relative amounts and timing) for the installment payments; and, 2) a specified credit quality for the component securities.

Calculate 122, using current market Treasury interest rates and the time pattern of the installment payments, the net of expected default losses installment payment amounts that have present value equal to the contract value of the investment.

Calculate 124, using the specified credit quality ratings of the component securities and the credit quality rating of the guarantor, a joint cumulative probability of default for each of the installment payments.

Calculate 126 the installment payment amounts that have a present value equal to the contract value of the investment by dividing each net of expected losses payment amount 122 by the quantity one minus the respective joint cumulative probability of default 124.

Determine 128 the cost of purchasing component securities of the specified credit quality in quantities and maturities such that the cash flows from the securities will be, in the absence of default, equal to or greater than the calculated 126 installment payments and then calculate the difference between the determined cost of the component securities and the market value of the investment.

If 130 the determined cost of purchasing the component securities of the portfolio is greater than the (realizable) market value of the investment (i.e., if the guarantor would be required, in an exemplary embodiment, to contribute funds in order to purchase the component securities of the portfolio) go to step 132. If 130 the determined cost of purchasing the component securities is less than the (realizable) market value of the investment (i.e., if the required, in an exemplary embodiment, cash contribution by the guarantor has been eliminated and there is an available margin above the purchase cost that can be used to reduce expected future defaults on the component securities) go to step 134. If 130 the determined cost of purchasing the component securities is equal to the (realizable) market value of the investment (i.e., if the iterative process has converged to a solution) go to step 136.

In step 132 the determined cost of the component securities is greater than the market value of the investment. If it is allowable under the terms of the agreement, change the time pattern of the cash flows so as lengthen the weighted average maturity and/or decrease the credit quality of the component securities—choosing the combination of lengthened maturity and decreased credit quality that minimizes the increase in expected default losses on the component securities while decreasing the cash contribution from the guarantor required (in an exemplary embodiment) to purchase the component securities—and go back to step 122 to start another iteration. If neither is allowable under the terms of the agreement, go to step 136 (the iterative process has converged to a solution).

In step 134, the determined cost of the component securities is less than the market value of the investment. Change the time pattern of the installment payments so as to shorten their weighted average maturity and/or increase the credit quality of the component securities—choosing the combination of shortened maturity and increased credit quality that minimizes the expected default losses on the component securities—and go back to step 122 for another iteration.

In step 136, the iterative process has converged to a solution. Output the determined installment payment amounts and timings 126 and the determined component securities and quantities 128. Calculate and output the guarantor's required (in an exemplary embodiment) cash contribution (equals determined cost minus the market value of the investments 130), if any. Using the cumulative expected default data and the credit quality of the component securities, calculate and output the expected future default losses faced by the guarantor.

FIG. 3B expands on the determining 108 of the component securities and their amounts that will make up the portfolio and illustrates one form of an iterative process 110 for jointly determining the component securities and amounts and the timings and amounts of the installment payments that minimize a measure of loss exposure for the guarantee—in this case a form of the iterative process that begins with the determination of the component securities and their amounts. Steps 140-156 illustrate a process for determining the component securities and their amounts that will make up the portfolio. Steps 140-156 illustrate an iterative process for minimizing a measure of loss exposure for the guarantor wherein the process begins with the determination of the component securities and their amounts. In the variation of the embodiment illustrated in FIG. 3B, the measure of the loss exposure for the guarantor that is minimized is the expected default losses on the component securities (which must, by the terms of the payment guarantee, be made up by the guarantor) subject to the constraint of minimizing or eliminating the required (in an exemplary embodiment) cash contribution by the guarantor toward the purchase of the component securities of the portfolio and wherein the cash flows from the component securities are required to be sufficient, in the absence of default, to fund the installment payments.

Determining 140, using the terms of the agreement, the ratio of market value to contract value at the time of the receipt of the request for payout at contract value, market data on possible choices for the component securities and, if applicable, results from previous iterations: 1) a maturity structure for the component securities; and, 2) a credit quality structure the component securities.

Determine 142, assuming a given purchase cost for the component securities (e.g., a purchase cost equal to the market value of the investment) and using the specified maturity and credit quality structures, the cash flows that will be produced by the component securities in the absence of default.

Determine 144 the installment payments that can be supported (assuming no defaults) by the cash flows of the component securities and, using the specified credit quality structure of the component securities and the credit rating of the guarantor, a joint cumulative probability of default for each of the installment payments.

Calculate 146 the present value of the installment payment amounts by first adjusting each amount for expected default losses (e.g., multiply each amount by the quantity one minus its respective joint cumulative probability of default) and discounting these loss-adjusted amounts by current Treasury interest rates.

Determine 148 the purchase cost 142 (and associated amounts of the component securities) that would have had to have been assumed in order to make the present value of the installment payments equal to the market value of the investment and calculate the determined purchase cost minus the market value of the investment.

If 150 the determined cost of purchasing the component securities of the portfolio is greater than the (realizable) market value of the investment (i.e., if the guarantor would be required, in an exemplary embodiment, to contribute funds in order to purchase the component securities of the portfolio) go to step 152. If 150 the determined cost of purchasing the component securities is less than the (realizable) market value of the investment (i.e., if the required, in an exemplary embodiment, cash contribution by the guarantor has been eliminated and there is an available margin above the purchase cost that can be used to reduce expected future defaults on the component securities) go to step 154. If 150 the determined cost of purchasing the component securities is equal to the (realizable) market value of the investment (i.e., if the iterative process has converged to a solution) go to step 156.

In step 152 the determined cost of the component securities is greater than the market value of the investment. If it is allowable under the terms of the agreement, change the time pattern of the cash flows so as lengthen the weighted average maturity and/or decrease the credit quality of the component securities—choosing the combination of lengthened maturity and decreased credit quality that minimizes the increase in expected default losses on the component securities while decreasing the cash contribution from the guarantor required (in an exemplary embodiment) to purchase the component securities—and go back to step 142 to start another iteration. If neither is allowable under the terms of the agreement, go to step 156 (the iterative process has converged to a solution).

In step 154, the determined cost of the component securities is less than the market value of the investment. Change the time pattern of the installment payments so as to shorten their weighted average maturity and/or increase the credit quality of the component securities—choosing the combination of shortened maturity and increased credit quality that minimizes the expected default losses on the component securities—and go back to step 142 for another iteration.

In step 156, the iterative process has converged to a solution. Output the determined installment payment amounts and timings 144 and the determined component securities and quantities 148. Calculate and output the guarantor's required (in an exemplary embodiment) cash contribution (equals determined cost minus the market value of the investments 150), if any. Using the cumulative expected default data and the credit quality of the component securities, calculate and output the expected future default losses faced by the guarantor.

FIG. 3C expands of the determining 112 of an amount of loss exposure for the guarantor. In the variation of the embodiment illustrated in FIG. 3C, the measure of the loss exposure for the guarantor that is minimized is the expected default losses on the component securities (which must, by the terms of the payment guarantee, be made up by the guarantor) subject to the constraint of minimizing or eliminating the required (in an exemplary embodiment) cash contribution by the guarantor toward the purchase of the component securities of the portfolio and wherein the cash flows from the component securities are required (in an exemplary embodiment) to be sufficient, in the absence of default, to fund the installment payments.

Determine 160 if the contract value of the investment is greater than the market value of the investment. If 162 the contract value is not greater than the market value of the investment, then go to step 164 and determine that the amount of loss exposure for the guarantor is equal to zero and output the zero loss exposure amount.

If 162 the contract value is greater than the market value of the investment, then go to step 166 and use the iterative process of FIG. 3A or FIG. 3B in order to determine and output a measure of the loss exposure of the guarantor (e.g., the amount, if any, that the guarantor would have to contribute in order to cover the cost of purchase of the component securities of the portfolio together with the expected default losses on the component securities).

Stable value contracts provide the purchaser of stabilized value with the ability to value investments on their books (book value) at a contract value rather than at market value. Because the contract value is, for the purposes of the purchaser of stabilized value, the book value of the investment, it is common practice to refer to the contract value as the book value and the following exposition frequently employs this convention (note that the contract value may also be referred to as the stable value or redemption value in some expositions).

The terms of a stable value contract can include a crediting rate adjustment process where the crediting rate is the contract, or stable value, rate of return that is used to determine the contract (book) value.

FIG. 4 is a flow chart of an illustrative embodiment that can offer the policyholder and/or protection buyer one or more of the following features: 1) choices regarding the stable value contract with differing features, including differing processes to adjust the crediting rate; 2) the choice of lower fees for choosing stable value contract with features that reduce the risk to the provider of stabilized value—the provider of stable value protection (SVP); 3) the choice of different combinations of minimum (before a forced write down of asset value and/or a forced 100% reallocation to money market or other high quality, short duration portfolio) market value to book value ratios (MV/BV) and the fee for providing stabilized value (with higher minimum ratios having lower fees due to the lower risk to the SVP provider); 4) the choice of illustrative embodiments of stable value contract terms that can reduce the probability of "breaching a contractually defined threshold" (e.g., being forced to reallocate to a money market fund and/or book a loss that reduces income in the event that the MV/BV ratio falls below the minimum MV/BV) and reduce the risk for the SVP provider.

The embodiment presented in FIG. 4 may be implemented on at least one essentially digital processing apparatus. The processing apparatus(es) may be associated with one or more of the entities depicted in FIG. 1. If more than one processing apparatus is implementing the embodiment, the processing apparatuses may work interdependently, independently, or some combination of both.

FIG. 4 is a flow chart of an illustrative embodiment that provides the policyholder with a menu of risk/return/cost choices 200 that include all of the above mentioned features. The menu of choices 200 may include choices regarding the stable value contract terms 202 and the minimum allowable (before being forced into money market fund and/or book a large loss) MV/BV 204.

The choices regarding minimum MV/BV 204 may be expressed as a range of ratios 206.

The stable value contract terms choices 202 and the minimum MV/BV choices 206 jointly determine 224 the risk of "breaching a contractually defined threshold," fees and the set of allowable and/or feasible investments—which may in turn define a set of investment risk/return options.

Stable value contract terms choices 202 can include the traditional stable value contract terms 208 and one or more of the illustrative embodiments of stable value contract terms 210.

The illustrative embodiments of stable value contract terms include: determining the stable value return using a built-up moving average of the yield-to-worst of the investment portfolio 212; a variable adjustment speed factor 214; an adjustment factor EF that fully amortizes an enhancement amount EA and an amortization of EA relative to the market value of the portfolio 216; and a required partial allocation to money market in response to a specified event 218.

The illustrative embodiments (FIGS. 4A, 4B, 4C and 4D) of stable value contract terms can all be utilized together in a stable value contract, or they can be used individually or in any combination.

The built-up moving average embodiment is an illustrative example of a broader embodiment. In the broader embodiment the stable value return is determined using a measure of the expected long-run return on the investment portfolio. The built-up moving average embodiment employs a built-up moving average of the yield-to-worst of the investment portfolio as a measure of the expected long-run return on the investment portfolio. Other illustrative embodiments may employ different measures of the expected long-run average return on the investment portfolio.

Possible other measures of the expected long-run average return on the investment portfolio include, but are not limited to: 1) econometric estimates of future returns; 2) fundamental analysis based on historical average returns (possibly broken up into components such as the real return and the inflation rate); and, 3) a combination of econometric and fundamental analysis.

A built-up moving average (where the length of the moving average is approximately equal to the duration of the investment portfolio) provides a robust estimate of the long-term expected return that can be easily and quickly implemented within the context of a stable value contract. For example, a the terms of a traditional stable value contract will typically include an equation similar to the following that is used to calculate the stable value return—which is commonly referred to in the contract as the crediting rate (CR).

$$CR=[(1+Y)*((MV+EA)/BV)^{1/D}]-EF-1 \text{ or } 0; \text{ whichever is greater, where:}$$

MV is the covered portfolio market value on the reference date;

EA is an amount equal to the product of (I) the Enhancement Adjustment Amount on the reset date and (II) a fraction, the numerator of which is the covered portfolio book value on the reference date and the denominator of which is the contract book value on the reference date;

BV is an amount equal to the covered portfolio book value on the reference date;

D is the duration (expressed in years or a fraction thereof) of the Reference Securities on the reference date (or a number, such as 3.5, fixed in the contract terms);

Y is the annual effective yield to worst of the Reference Securities on the reference date;

EF is an amount equal to the Enhancement Factor on the reset date; and,

CR is reset quarterly.

The terms of the traditional stable value contract can by modified to use the built-up moving average of the yield-to-worst (Y) by replacing Y with EY in the formula for determining the stable value return (the crediting rate, or CR) as follows:

$$CR=[(1+EY)*((MV+EA)/BV)^{1/D}]-EF-1 \text{ or } 0, \text{ whichever is greater where:}$$

EY is a built-up moving average of Y.

EY can be calculated a number of ways.

In one variation, given a moving average of 60 months, and assuming that the investment portfolio covered by the stable value contract was purchased in month 0: EY for month 1 will equal the Y for month 0 multiplied by 60 with the result divided by 60; EY for month 2 will equal the Y for month 1 plus the Y for month 0 multiplied by 59 with the result divided by 60; EY for month 3 equals the Y for month 2 plus the Y for month 1 plus the Y for month 0 multiplied by 58, etc. until month 60 at which point EY becomes a simple 60 month moving average of Y for the previous 60 months.

In another variation, again given a moving average of 60 months, and again assuming that the investment portfolio covered by the stable value contract was purchased in month 0: EY for month 1 equals the Y for month 0; EY for month 2 equals the Y for month 0 plus the Y for month 1 with the result divided by 2; EY for month 3 equals the Y for month 0 plus the Y for month 1 plus the Y for month 2 with the result divided by 3, etc. until month 60 at which point EY becomes a simple 60 month moving average of Y for the previous 60 months.

Results obtained from simulation models demonstrate that replacing Y with a built-up moving average of Y in the terms of a stable value contract can result in: 1) a reduced risk of "breaching a contractually defined threshold" (a forced write down of book value and/or a forced 100% reallocation to money market) for the purchaser of the stable value protection (SVP); 2) a more stable (less variable) stable value return for the purchasers of the SVP; and, 3) reduced risk for the provider of the SVP.

Another illustrative embodiment of stable value contract terms is a variable adjustment speed factor. Incorporating a variable adjustment speed factor into the terms of a stable value contract can: 1) significantly reduce the risk (and expected cost) of "breaching a contractually defined threshold" for the purchaser of the SVP; and; 2) significantly reduce risk for the provider of the SVP.

Traditional stable value contract terms specify an adjustment speed factor, 1/D that is either constant (if the contract specifies a fixed number for D) or effectively constant (if D equals the actual duration of the investment portfolio) because the actual duration of the investment portfolio typically varies very little. Because the fixed (or effectively fixed) adjustment speed is very slow, the result is a significant risk for purchasers of SVP of "breaching a contractually defined threshold" and, for providers of SVP, an increased risk exposure.

The consequences for the policyholder and/or protection buyer of "breaching a contractually defined threshold" can be significant. Given the consequences of "breaching a contractually defined threshold," policyholders and/or protection buyers may prefer a process that reduces this probability— even if a more rapid adjustment of the crediting rate (stable value return) increases the short-term volatility of the accounting earnings on the invested funds.

If the consequence of a breach is a forced shift to a money market fund, the policyholder's and/or protection buyer's return on investment may fall significantly. The lower yield can make it difficult to "make back" the shortfall of MV to BV, thus forcing the policyholder and/or protection buyer to remain in a lower yielding money market fund for a significant period of time. And the forced shift into a money market fund may occur just as interest rates are peaking, thus preventing the policyholder and/or protection buyer from reaping the gains that will accrue for a longer-duration portfolio as interest rates fall.

If the consequence is booking a loss (from BV to MV), the profits of the policyholder and/or protection buyer can be significantly reduced. The result can be a fall in the policyholder's and/or protection buyer's stock price.

The illustrative embodiment of the terms of a stable value contract including a variable adjustment speed factor is an illustrative embodiment of an exemplary embodiment in which the terms of the stable value contract make the process of adjusting the stable value return (e.g., the crediting rate, CR) a function of risk.

Factors that can affect risk include, but are not limited to:
The current level of MV/BV (as MV/BV falls below 1 and approaches breach, risk increases);
The risk of surrender by the policy owner, which in turn may be a function of the financial health of the policy owner and the taxable gain that will result from surrender;
The asset class;
The surrender options available to the provider of stabilized value (e.g., standard process, modified standard process, enhanced crawl out options, etc.); and/or,
Systemic risk.

An example of a stable value contract terms including a variable adjustment speed factor is the use a formula for determining the stable value return (the crediting rate or CR) in which the speed of adjustment for CR increases as the MV/BV ratio approaches breach (the point at which the SVP purchaser will "fall off the cliff"). In the following example A is the acceleration (variable adjustment speed) factor that determines the speed with which the crediting rate responds to divergences of (MV+EA)/BV from a value of one. The acceleration factor A increases as the MV/BV ratio approaches breach and, as A increases the CR adjusts faster.

$$CR = ((MV+EA)/BV)^A * (1+EY) * (1-EF) - 1 \text{ and}$$

$$A = 1/(a + b*((MV+EA)/BV - BR)/(1-BR)) \text{ for } (MV+EA)/BV > BR \text{ but equal to or less than 1;}$$

$$A = 1/a \text{ for } (MV+EA)/BV \text{ equal to or less than BR}$$

$$A = 1/(a+b) \text{ for } (MV+EA)/BV > 1$$

Where:
CR is the crediting rate.
MV is the market value.
EA is the Enhancement Amount.
BV is the book value.
A is the Acceleration factor.
EY is a built-up moving average of Y, the Yield to Worst of the investment portfolio.
EF is the amortization factor for fully amortizing EA and wherein EA is amortized relative to MV.
1/a is the maximum value for the Acceleration factor, A (may be increased as risk increases).
1/(a+b) is the minimum value for the Acceleration factor, A.
BR is the Breach Ratio.

The variable adjustment speed factor addresses only one aspect of risk—changes in the MV/BV. Exemplary embodiments can include risk-adjusted adjustment processes that incorporate the ability to respond to changes in risk factors other than changes in the MV/BV.

Exemplary embodiments can include risk-adjusted processes for setting the crediting rate in which the response of A to changes in the MV/BV and/or the (MV+EA)/BV ratio can change in response to changes in other risk factors, including, but not limited to: 1) changes in the risk of surrender; 2) changes in the asset class/classes; 3) changes in the portfolio manager/managers; 4) changes in investment management policies and/or guidelines; 5) changes in the credit risk of the underlying investments; 6) changes in the surrender process; and/or 7) changes in systemic risk.

In the case of systemic risk, the risk-adjusted process for setting the crediting rate can be further modified to reduce the risk of asset bubbles (e.g., market prices in excess of true economic values) that can be associated with times of significant systemic risk.

Exemplary embodiments can include computerized configurations for detecting the presence of systemic risk and estimating its magnitude. A principle that can be employed by these exemplary embodiments is that systemic risk increases as key economic factors diverge from the mean in directions that can be expected to negatively impact future changes in asset values. The larger and longer lasting the deviation from the mean, the greater the systemic risk may be. Examples of possible key economic variable include: 1) the real rate of interest (prolonged periods of real rates below long-term averages may be a component of both asset bubbles and prolonged periods of inflation); 2) P/E ratios (in real estate as well as stocks) in excess of their long-term averages; 3) credit risk spreads that have significantly diverged from their long-term averages; 4) relative levels of financial leverage—especially the use of short-term debt to finance long-term assets—that exceed the long-term average; 5) other measures of speculative activity (e.g., number of IPO's and short-term rates of return on IPO's relative to long-term averages); and/or 6) periods of unusually low volatility (relative to long-term averages) in financial markets—standard risk models that project future volatility to equal current volatility may produce the perverse result of lower risk estimates in times when systemic risk is building up to high levels.

Exemplary embodiments can include risk-adjusted processes for setting the crediting rate that respond to any identified risk factor, including systemic risk. The role of A in the sample risk-adjusted crediting rate setting process presented below is to accelerate the adjustment of the crediting rate as risk increases.

The greater A is, the greater the speed of the adjustment of the crediting rate. The smaller A is, the slower the speed of the adjustment of the crediting rate. As a result, in order to reduce risk, A can be varied to increase the speed of adjustment (higher A) as MV/BV falls and to decrease the speed of adjustment (down to some lower limit) as MV/BV increases. The amount of the adjustment of A in response to changes in MV/BV can also be adjusted for risk so as to increase the protection for the SVP provider as risk increases by increasing the rate at which A increases as MV/BV decreases. Further, a systemic risk amount, SA, and/or a systemic risk adjustment factor, SR, may be included in certain exemplary examples.

One possible form of this risk-adjusted crediting process is presented below:

$$CR = \text{the greater of } ((MV+EA-SA)/BV)^{A}*(1+EY)*(1-EF)*(1-SR)-1 \text{ or some specified minimum, which may vary with risk, and}$$

$$A = 1/(a+b*(((MV+EA-SA)/BV-BR)/(1-BR))) \text{ for } (MV+EA-SA)/BV > BR \text{ but equal to or less than } 1;$$

$$A = 1/a \text{ for } (MV+EA-SA)/BV \text{ equal to or less than BR}$$

$$A = 1/(a+b) \text{ for } (MV+EA-SA)/BV > 1$$

Where:
CR is the crediting rate.
MV is the market value.
EA is the Enhancement Amount.
SA is the Systemic Risk amount.
BV is the book value.
A is the Acceleration factor.
EY is a built-up moving average of Y, the Yield to Worst of the investment portfolio.
EF is the amortization factor for fully amortizing EA and wherein EA is amortized relative to MV.
SR is the systemic risk adjustment factor for building up a Systemic Risk amount equal to SA.
1/a is the maximum value for the Acceleration factor, A (may increase as risk increases).
1/(a+b) is the minimum value for the Acceleration factor, A.
BR is the Breach Ratio.
r is the Risk factor, which increases as risk increases.

If r<1, the acceleration factor A will initially rise slowly as MV+EA−SA falls below BV, thus maintaining much of the dampening of the fluctuations in the crediting rate. However, as (MV+EA−SA)/BV approaches BR (the breach ratio), A will increase rapidly, thus quickly pushing the crediting rate to its lower limit and working to prevent breach.

As r is increased to a sufficiently large number, the crediting rate will fall almost immediately to its lower limit (e.g., zero) whenever (MV+EA−SA)/BV becomes less than one.

In this risk-adjusted process, r can be increased (and 1/a may be increased) in response to an increase in any of the risk factors (including systemic risk). If a condition of systemic risk is detected, SA and SR can become positive and increase over time, provided that systemic risk continues exist and increase. In some exemplary embodiments, SA may be estimated to equal the difference between the present value of the expected cash flows of the assets discounted at the long-term average real rate of interest and the current market value of the assets.

A feature of a stable value contract can be the ability to include an Enhancement Amount that is added to the starting market value in order to increase the starting book value so as to avoid a decrease in earnings as a result of certain initial costs (e.g., premium taxes). Another illustrative embodiment is a computerized configuration to implement terms of a stable value contract that determine an adjustment factor EF that fully amortizes an enhancement amount EA and wherein the EA is amortized relative to the market value of the investment portfolio.

Full amortization of EA by EF can be accomplished by a combination of a new form for the stable value return equation, a new process for calculating EF, and a new process for calculating the amortization of EA relative to the market value of the investment portfolio—rather than relative to the book value of the portfolio.

In the new form of the crediting rate equation (see below), the EF factor enters the equation multiplicatively rather than as a subtraction as in the traditional terms of a stable value contract.

$$CR = ((MV+EAt)/BV)^{1/D}*(1+Y)*(1-EF)-1$$

CR is the Crediting Rate.
MV is the market value of the portfolio.
EA is the Enhancement Amount
BV is the book value of the portfolio.
D is the duration (actual or assigned) of the portfolio.
Y is the yield to worst of the portfolio.
EF is the Enhancement Factor (the reduction in the crediting rate so as to fully amortize the original Enhancement Amount ($EA_0$) over the amortization period).

This new form of the crediting rate adjustment process makes it possible to define an EF (and associated full amortization of $EA_0$) that is independent of Y. In the crediting rate adjustment process that is used today, the EF that will fully amortize $EA_0$ over the stated amortization period is a positive function of Y—the higher that Y turns out to be, the larger EF must be in order to fully amortize EA over the amortization period. Therefore, given the form of the credit adjustment process that is presently used, it is necessary to know what level of Y will prevail over the amortization period in order to calculate the EF that will fully amortize $EA_0$ over the amortization period—which requires predicting the future.

In contrast, this new form of the crediting rate adjustment process allows the calculation of an EF that fully amortizes $EA_0$ over the amortization period and is independent of Y. Specifically:

$$EF = 1 - 1/(1+EA_0/MV_0)^{1/N}$$

EF is the Enhancement Factor that fully amortizes $EA_0$ over the amortization period
$EA_0$ is the original Enhancement Amount at t=0
$MV_0$ is the starting market value at t=0
N is the amortization of EA in years
Given the EF as defined above, $EA_0$ is amortized according to the following formula:

$$EA_t/MV_t = ((MV_0+EA_0)/MV)*(1-EF)^{t}-1$$

$EA_t$ is the Enhancement Amount at time t
$MV_t$ is the market value at time t
t is the time in years, and t varies continuously between 0 and N Given the above defined amortization schedule, for any constant Y, $MV_t + EA_t$ will always equal $BV_t$ and, at t=N, $EA_t$ will equal 0 (at which point EF becomes 0).

The crediting rate adjustment process that is presently used makes the EF that will fully amortize $EA_0$ over the amortization period a function of Y. In this equation, $$CR = ((MV+EA)/BV)^{1/D} * (1+Y) - EF - 1$$

Although this current state of the art crediting rate adjustment formula makes the EF that will fully amortize EA0 a function of Y, the current state of the art does not consider this, but rather calculates an EF that is too small to fully amortize $EA_0$ over the stated amortization period (given a return on investment that is equal to or greater than zero over the amortization period). The result of the too small EF is an increase in the loss exposure of SVP providers as compared to the use of an EF that will fully amortize $EA_0$ over the amortization period.

The current state of the art is to define EF as follows:

$$EF = (EA_0/BV_0)/N$$

$BV_0$ is the book value at t=0 and $BV_0 = MV_0 + EA_0$
EA is then amortized using the following formula:

$$EA_t/BV_t = (EA_0/BV_0)/N - t/N * (EA_0/BV_0)/N$$

In addition to an EF that is less than the EF that will fully amortize $EA_0$ over the amortization period, the result is an amortization of EA in which for t>0 and t<N and any constant Y, $MV_t + EA_t < BV_t$.

Because EF is defined to be insufficient to fully amortize $EA_0$ over the amortization period, the current state of the art produces an increased exposure to loss by SVP providers as compared to what they may experience by utilizing the illustrative embodiment presented above. Use of this exemplary embodiment can reduce the loss exposure of SVP providers by an amount equal to $20 to $40 million per $100 billion of market value. The potential of the illustrative embodiment to reduce the loss exposure of SVP providers can be even greater in turbulent market conditions because EA is amortized relative to MV, rather than relative to BV as in the current state of the art. Because the state of the art is to amortize EA relative to BV, EA will be overstated in situations in which BV exceeds MV, which in turn slows the adjustment of the crediting rate due to an overstated EA, which can further increase the loss exposure of the SVP provider.

In yet another illustrative embodiment is a computerized configuration to implement the terms of the stable value contract wherein the terms require a partial allocation to money market in response to a specified event.

In one variation of such terms, an amount of partial allocation to money market is required when the MV/BV ratio falls below a specified amount. There may be a series of specified MV/BV ratio amounts, with the required amount of partial allocation to money market increasing as the MV/BV ratio falls below lower specified MV/BV ratio amounts.

In another variation of such terms, a ratio of the current net asset value (NAV) relative to the maximum-to-date NAV and if the calculated ratio falls below a specified amount, an amount of a partial allocation to money market is required. Again there may be a series of specified ratio amounts, with the required amount of partial allocation to money market increasing as the calculated ratio falls below lower specified ratio amounts.

In still another variation of such terms, the amount(s) of the required partial allocation to money market is adjusted for the shape of the yield curve (e.g., the ratio of the current yield-to-worst of the investment portfolio to the current return on a money market fund).

Each of the illustrative embodiments for computerized configurations to implement the terms of a stable value contract at the beginning of a stated period of time period (e.g., the adjustment period) or at the end of the time period. An adjustment period can be any desired period of time—e.g., quarterly, monthly, weekly, etc.

FIG. 4A is a flow chart of an illustrative embodiment. In FIG. 4A, there is a storing in memory terms of an agreement governing a stable value contract whereby a stable value return is to be determined by using a built-up moving average of the yield-to-worst outcome of an investment portfolio 220. Calculating, by a digital computer accessing the memory and receiving market data, an amount of the built-up moving average 222. Determining, by the computer using the amount, at least one of a stable value return on the investment portfolio and a contract value for the investment portfolio 224. Outputting, by the computer, at least one of the determined stable value return and the determined contract value 226.

FIG. 4B is a flow chart of an illustrative embodiment. In FIG. 4B, there is a storing in memory terms of an agreement governing a stable value contract, the terms including a variable adjustment speed factor 240. Calculating, by a digital computer accessing the memory and receiving market data, an amount of the adjustment speed factor 242. Determining, by the computer using the calculated amount, at least one of a stable value return on the investment portfolio and a contract value for the investment portfolio 244. Outputting, by the computer, at least one of the determined stable value return and the contract value 246.

FIG. 4C is a flow chart of an illustrative embodiment. In FIG. 4C, there is a storing in memory terms of an agreement governing a stable value contract, the terms including an adjustment factor EF that fully amortizes an enhancement amount EA over a period of time specified in the terms and wherein the EA is amortized relative to a market value of an investment portfolio 260. Determining, by a digital computer accessing the memory, an amount of EF and an amortization of the EA relative to the market value 262. Determining, by the digital computer accessing the memory, receiving market data, and applying the determined amounts, at least one of a stable value return on the investment portfolio and a contract value for the investment portfolio 264. Outputting, by the computer, at least one of the determined stable value return and the contract value 266.

FIG. 4D is a flow chart of an illustrative embodiment. In FIG. 4D, there is a storing in memory terms of an agreement governing a stable value contract, the terms including a requirement for at least one partial allocation of an investment portfolio to at least one money market fund given an occurrence of at least one specified event 280. Determining, by a digital computer accessing the memory and receiving market data, whether the at least one specified event has occurred and, if the at least one specified event has occurred, outputting an amount for the at least one partial allocation 282. Determining, by the computer accessing the memory and receiving market data, at least one of a stable value return and the contract value of the investment portfolio 284. Outputting, by the computer, at least one of the determined stable value return and the contract value 286.

FIG. 5 is a flow chart of an embodiment by which owners of Bank Owned Life Insurance (BOLI) and Corporate Owned Life Insurance (COLI) can simultaneously: 1) smooth the variable and unpredictable accounting income that can result from the receipt of death benefits on BOLI/COLI policies; and, 2) receive a favorable modification in the terms of an existing stable value agreement and/or a new stable value agreement that might otherwise not be available or on more favorable terms than otherwise possible. In other words, this embodiment can make it possible for the purchaser of stabilized value (the owner of BOLI/COLI policies to achieve stabilized value (i.e., a smoothing of accounting income) for accounting income that is not smoothed under the terms of existing stable value agreements while receiving a reduced cost (or other benefit, such as increased investment options that may improve investment performance) for its existing, or new, stable value agreements.

In this embodiment, the BOLI/COLI policy owner (the purchaser of stabilized value) agrees to write down the contract (book) value of BOLI/COLI policies covered by an existing or a new stable value agreement by the amounts (or some part of the amounts, although maximum benefit can be achieved by writing down by the full amounts) of the accounting income that can result from the receipt of death benefits of existing BOLI/COLI policies in return for receiving a benefit in the terms of an existing or a new stable value agreement.

Writing down the contract (book) value of BOLI/COLI by the amount (or a portion of the amount) of accounting income associated with the receipt of a death benefit of a BOLI/COLI policy can cause the crediting rate (the contract or stable value rate of return) to increase to an amount higher than it would have been, thus causing the accounting income from the receipt of the death benefit to be received over a period of years rather than all at once, thus smoothing the otherwise volatile and unpredictable accounting income flows that are generated from the receipt of death benefits on BOLI/COI policies. There is no negative impact on investment income generated by the receipt of funds from the death benefits because only the receipt of the accounting income is delayed—the investable cash received from the payment of the death benefit is neither delayed nor reduced.

Writing down the contract (book) value of BOLI/COLI policies benefits the guarantor (the wrap provider) of the contract (book) value decreasing both the frequency and the amounts by which market values fall below contract (book) values, thus reducing the risk exposure of the guarantor (stable value wrap provider). In return for reducing the risk of the wrap provider, the BOLI/COLI policy owner can negotiate more favorable terms for an existing or new wrap agreement—e.g., a reduced cost of the wrap agreement, increased investment options, greater flexibility in switching between allowable investment options, etc.

FIG. 5 is a flow chart of a possible implementation of an exemplary embodiment. The exemplary embodiment presented in FIG. 5 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

Storing 300 in memory terms of an agreement with a stable value wrap provider, wherein the purchaser of the stable value protection agrees to reduce the book value of an investment covered by a stable value agreement when an amount of accounting income is realized upon receipt of a death benefit in return for at least one of a modification in terms of an existing stable value agreement and a new stable value agreement.

Determining 302 by a digital computer accessing the memory, using the terms of the agreement and receiving data, including data regarding a payment of a death benefit and further including an amount of accounting income associated with the death benefit, an amount of the reduction in book value for the investment covered by the stable value agreement.

Outputting 304 by the computer the amount of the reduction in book value.

Further exemplary embodiments may include a computer-aided process for a dynamic pricing model or models (FIG. 6). A function of the dynamic pricing model (or models) is to introduce risk-based pricing into the process of delivering stabilized value or other assumption of risk.

Risk-based pricing may expand the investment options (investments and/or asset classes) available to policyholders and/or protection buyers, increase their ability to rebalance their investment portfolio as market conditions change, and make it possible for them to improve their risk/return tradeoff. It may align the interests of the purchasers and sellers of stabilized value, etc. and reduce system risk. It may lower costs for purchasers of stabilized value, etc. (policyholder and/or protection buyer) and stabilize profits for the sellers of stabilized value, etc.

In this exemplary embodiment, the model may be utilized to determine initial pricing for various investment options (investments and/or asset classes) that remains unchanged throughout the contract (for stabilized value, etc.). Or the model may contain agreed upon parameters and processes that determine new fee schedules on an ongoing and/or periodic basis as market conditions and/or policyholder and/or protection buyer factors change.

The model may apply to all of the (potential) investments and/or asset classes open to a policyholder and/or protection buyer or multiple policyholders and/or protection buyers. The model or modals may apply to all of the (potential) investments and/or asset classes open to some policyholders and/or protection buyers and only part of the investments and/or asset classes open to others. The model or models may apply only to a particular set of investments and/or asset classes, which may be held by one or more policyholders and/or protection buyers.

In the event of multiple models, the models may be independent, dependent, interdependent, or any combination of independent, dependent and interdependent. A model or models may be implemented by one processing apparatus or multiple processing apparatuses.

FIG. 6 illustrates how a pricing model functions according to one exemplary embodiment. And FIG. 6A illustrates how the model may be extended to encourage behavior that reduces risk (and, therefore, fees) and discourage behavior that increases risk, for individual policyholders and/or protection buyers and/or for groups of policyholders and/or protection buyers.

Groups of policyholders and/or protection buyers may arise for a number of reasons, including, but not limited to: 1) the policyholders and/or protection buyers are customers of the same provider of stabilized value, etc.; 2) the policyholders and/or protection buyers are all purchasers or potential purchasers of one or more methods of providing stabilized value, etc. (e.g., a SVP agreement, special classes of shares, specified event swaps, Specified Event Bonds, and/or specified event put options); 3) policyholders and/or protection buyers that have come together either formally or informally to bargain for lower costs and/or better terms for stabilized value, etc.; 4) policyholders and/or protection buyers and one or more providers of stabilized value, etc. that are bound together by a synthetic mutual structure with features that may include, for policyholders and/or protection buyers, rewards for reducing risk and punishments for increasing risk, and profit limitations for the provider(s) of stabilized value (or other risk assumption); and/or 5) partnerships of policyholders and/or protection buyers that may allow owners of lower-performing BOLI/COLI policies to exchange into higher performing policies and creating other benefits including lower fees and superior terms due to economies of scale and reduced risk for the provider(s) of stabilized value, etc.

The exemplary embodiment presented in FIG. 6 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

In FIG. 6, the dynamic pricing model is implemented by entering data regarding the risk of at least one investment/asset class 400. The risk data regarding the investment/asset class may include the terms of an agreement or agreements regarding the provision of stabilized value, etc. (e.g., the specification of an adjustment process, minimum MV/BV, etc.). The risk data regarding the investment/asset class may pertain to stand-alone risk and/or portfolio risk. In the event that the data pertains to portfolio risk, it may include a specification of and/or limitations on the other potential investments in the portfolio and/or risk data (including possibly joint risk data) regarding the potential investments in the portfolio.

Data may also be entered regarding the risk of at least one specified event 402. Data entered may include data regarding the risk of one or more individual specified events and, if more than one, data regarding joint risks.

The system then determines the joint risk 404 of the investment/asset class and at least one specified event (e.g., determining the joint probability of market value less than book value, and by how much, with the probability of one or more specified events). Market pricing data 406 is entered into the system (market pricing data may be derived from primary and/or secondary market transactions) and the system then determines and outputs 408 a price (fee) schedule for providing stabilized value or other assumption of risk.

The dynamic pricing process illustrated in FIG. 6 may occur only once or it may occur on an ongoing and/or periodic basis (e.g., in response to changes in one or more factors impacting joint risk).

The exemplary embodiment presented in FIG. 6A may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

FIG. 6A is a flow chart of an exemplary embodiment that may encourage behavior that reduces risk (and, therefore, fees) and discourage behavior that increases risk, both for individual policyholders and/or protection buyers and for groups of policyholders and/or protection buyers.

The computer-aided process may begin with risk-based, as determined in FIG. 6, fees 420 for providing stabilized value, etc. Actions that increase risk 422 are specified and input into the system for individual policyholders and/or protection buyers and, if applicable, for joint actions. Actions that decrease risk 424 are specified and input into the system for individual policyholders and/or protection buyers and, if applicable, for joint actions. The system then determines and outputs a schedule of adjusted fees, potential refunds (for actions taken or not taken), and penalties (for actions taken or not taken) 426.

The process of the exemplary embodiment illustrated in FIG. 6A may include synthetic mutual structures or entities that may reduce the risks faced by providers of stabilized value, etc. in return for the acceptance of a cap on profitability. In return for accepting a cap on profitability, the providers of stabilized value, etc. may be allowed to increase fees in the event that losses incurred and/or exposure to losses are higher than originally anticipated.

Correspondingly, the purchasers of stabilized value, etc. may be assured of an opportunity to achieve lower net costs over time if losses and/or exposure to losses than originally anticipated while confining exposure to higher fees within defined limits. A formulaic cushion may be factored into early year fees along with a formulaic method for apportioning refunds, higher crediting rates and/or reducing future fees of members in good standing.

Surrendering policyholders and/or protection buyers may forfeit a portion of all future refunds, crediting rate enhancements and/or cost reductions. What is more, all or part of any excess early fees may effectively provide a back-stop for policyholders and/or protection buyers during periods when crediting rates might otherwise drop to undesirable levels. Thus, it may be possible to engineer significant economic incentives and/or disincentives into the synthetic mutual structure or entity that will reduce the probability that policyholders and/or protection buyers will take on ill advised levels of risk and/or surrender policies due to temporary market value declines. It may even be possible for purchasers of the desired protection to receive a capital stake in the mutual or synthetic mutual structure, thereby further reducing the probability of harmful behaviors and/or surrenders.

Still another exemplary embodiment (FIG. 7) is a computerized configuration to implement at least one agreement between a first class of ownership interest and at least one other class of ownership interest wherein the first class of ownership interest pays consideration to the at least one other class of ownership interest in return for stabilized value, risk mitigation, etc. In such an embodiment, an accounting treatment can include accounting for an investment at a contract value (also, depending on the context, can be referred to as a "stable value" or "book value") rather than at market value.

Such an exemplary embodiment processing can provide stabilized value, etc. by allowing an investor in an other class of ownership interest (meeting specified qualifying requirements) the ability to earn consideration from a first class of ownership interest in return for providing stabilized value, etc. As may be desired, such an embodiment can implement risk-based pricing, which in turn can be carried out by utilizing one or more risk model(s) corresponding to the embodiment, as illustrated herein. Accordingly, an investor who places value on an increased long-term average rate of return and has a tolerance for increased short-term volatility may find the additional consideration associated with providing stabilized value, etc., attractive. Illustratively, such investors can include, but are not limited to, defined-benefit pension plans (including state and local government pension plans) and high-net-worth individuals.

A computer implementation of such an embodiment can be carried out in a number of variations, as may be desired for one application or another. Illustratively, the classes of ownership interest embodiment can be exemplified as a method of using an apparatus, the method including: 1) storing in memory 52 data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; 2) determining, by a digital computer accessing the memory 52 and receiving market data corresponding to an investment associated with the first class of ownership interest, an amount of the risk exposure and an amount of the consideration; and 3) outputting, by the computer, at least one of the amounts. Apparatus (including system) and article implementations can also be used.

Such an embodiment can provide processing such that the first class of ownership interest a desired accounting treatment—e.g., accounting for the value of an investment portfolio at a contract value (or, interchangeably, a book value or stable value) rather than at market value—the risk exposure of the at least one other class of ownership interest can equal the excess, if any, of the contract value (book value, stable value) over the market value of the investment portfolio.

As may be preferred in one implementation or another, if the first class of ownership interest is an ownership interest in a separate account life insurance policy (as in Bank Owned Life Insurance and Corporate Owned Life Insurance), the specified event can be a qualifying (under the terms of the agreement) surrender of the policy.

In another implementation, if the first class of ownership interest is in a stable value investment fund (e.g., within a 401k plan), the specified event can be net withdrawals in excess of market value.

In yet another approach, it may be desired that the first class of ownership interest has an agreement with more than one other class of ownership interest—e.g., the agreement is such that the at least one other class of ownership interest comprises at least two other classes of ownership interest. Or, the first class of ownership interest can have more than one agreement with respectively at least one other class of ownership interest. In this event the more than one other class of ownership interests can be exposed to tiers of a specified risk, to different specified risks, or any combination thereof.

An embodiment may further include receiving data corresponding to the occurrence, and determining from the data corresponding to the occurrence whether the occurrence has occurred, and if the occurrence has occurred, determining an amount of the loss; and outputting the amount of the loss.

Depending on the desired implementation, the amount of the loss may or may not equal the loss exposure at the time of the occurrence of the specified event. For example, if the loss exposure is the excess of contract value over market value and the specified event is the qualifying surrender of an insurance policy, the agreement can specify that in the event of a qualifying surrender, the investment portfolio will be liquidated, that the proceeds will be invested in a money market fund and that the loss amount payable will be the difference between contract value at the time of surrender and the value of the money market fund investment one year after the surrender.

The specified risk can be one or more variety of risk—e.g., it may be that the agreement is such that the at least one specified risk includes at least one of an interest rate risk, a price risk, a liquidity risk, an inflation risk, a credit risk, a currency risk, and a benefit guarantee risk.

In another variation, the first class of ownership interest and the at least one other class of ownership interest are different classes of ownership in the same entity. For example, the first class of ownership interest and the at least one other class of ownership interest can be classes of ownership interest in the same partnership, limited liability fund, investment fund, etc. If they are different classes of interest in a partnership (or a limited liability company that elects to be taxed as a partnership), it is possible for the at least one other class of ownership interest to provide the first class of ownership interest stabilized value (e.g., valuing a portfolio of securities at contract value rather than market value) through the use of hypothetical liquidation accounting.

In an implementation, it may be desired that the first class of ownership interest and the at least one other class of ownership interest are classes of ownership in different entities. For example, the first class of ownership interest can be a class of ownership interest in a stable value fund and the at least one other class of ownership interest can be a class of ownership interest in another investment fund (e.g., a hedge fund, a defined-contribution pension fund, etc.).

It may be desired that the first class of ownership interest is one of more than one class of ownership interest in a partnership. In which case, the at least one other class of ownership interest may or may not be a different class of ownership interest in the same partnership, depending on the implementation preferred for the situation of interest.

In another variation, the first class of ownership interest is an interest in a partnership, and the partnership has only one class of ownership interest in the partnership.

In yet another variation, the first class of ownership interest is one of more than one class of ownership interest in a limited liability company. In which case, the at least one other class of ownership interest may or may not be a different class of ownership interest in the same limited liability company, depending on the implementation preferred for the particular circumstances of the implementation.

In a limited liability approach, it may be that the first class of ownership interest is an interest in a limited liability company, and the limited liability company has only one class of ownership interest in the limited liability company.

In another variation, the first class of ownership interest is one of more than one class of ownership interest in an investment fund. In which case, the at least one other class of ownership interest may or may not be a different class of ownership interest in the same investment fund, as may be preferred under the particular circumstances of implementation.

Another variation can be carried out with the first class of ownership interest is an ownership interest in an investment fund, and the investment fund has only one class of ownership interest in the investment fund.

Again, variations in implementation can be carried out, for example, that: the investment fund is an investment fund registered with the SEC; the investment fund is an investment fund not registered with the SEC; the investment fund is a closed-end fund; the investment fund is an open-end fund; the investment fund is an exchange-traded fund; or that the investment fund is a hedge fund. Each has particular attributes which may be preferred in one or another particular situation.

By way of more examples of variations, consider that: the first class of ownership interest can be a class of ownership interest in an investment division of a separate account of an insurance company; the first class of ownership interest can be an ownership interest in a separate account insurance policy; or the first class of ownership interest can be an ownership interest within a retirement plan.

In such situations, an implementation may be such that the retirement plan: includes an elective deferral provision; is a defined-contribution pension plan; is a defined-benefit pension plan; is a cash-balance pension plan; is an IRA; is an ownership interest within a profit sharing plan; or is an ownership interest within a profit sharing plan in which there is an elective deferral provision.

In other variations, the first class of ownership interest is an ownership interest within an employee stock ownership plan (ESOP) or is an ownership interest within an employee stock ownership plan (ESOP) in which there is an elective deferral provision.

In yet another variation, the at least one other class of ownership interest is one of more than one class of ownership interest in a partnership or that it is an ownership interest in a partnership, and the partnership has only one class of ownership interest in the partnership.

In still another variation, the at least one other class of ownership interest is one of more than one class of ownership interest in a limited liability company or that it is an ownership interest in a limited liability company, and the limited liability company has only class of ownership interest in the limited liability company.

In an additional variation, the at least one other class of ownership interest is one of more than one class of ownership interest in an investment fund or that it is an ownership interest in an investment fund, and the investment fund has only class of ownership interest in the investment fund.

As may be desired in one variation or another, the investment fund is: registered with the SEC; not registered with the SEC; a closed-end fund; an open-end fund; an exchange-traded fund; or a hedge fund.

Likewise, as may be desired in one variation or another, it may be that the at least one other class of ownership interest is: a class of ownership interest in an investment division of a separate account of an insurance company; an ownership interest in a separate account insurance policy; or an ownership interest within a retirement plan.

Again, an implementation may be carried out such that the retirement plan: includes an elective deferral provision; is a defined-contribution pension plan; is a defined-benefit pension plan; is a cash-balance pension plan; is an IRA; or a Roth IRA.

Another approach is to have the at least one other class of ownership interest be an ownership interest within a profit sharing plan or that it be an ownership interest within a profit sharing plan in which there is an elective deferral provision.

In variations, the at least one other class of ownership interest is an ownership interest within an employee stock ownership plan (ESOP) or that the at least one other class of ownership interest is an ownership interest within an employee stock ownership plan (ESOP) in which there is an elective deferral provision.

In yet further variations, it may be that: the first class of ownership interest is a class of ownership interest in a partnership and the at least one other class of ownership interest is an other class of ownership interest in the partnership; the first class of ownership interest is a class of ownership interest in a limited liability company and the at least one other class of ownership interest is an other class of ownership interest in the limited liability company; or the first class ownership interest is a class of ownership interest in an investment fund and the at least one other class of ownership interest is an other class of ownership interest in the investment fund.

More variations can be carried out such that the first class of ownership interest is an ownership interest in at least one marketable security or in a portfolio of marketable securities. The at least one other class of ownership interest can be an ownership interest in at least one marketable security or in a portfolio of marketable securities.

The specified risk, or risks, can include any category of financial risk. Illustratively, the specified risk can be: an interest rate risk associated with the first ownership interest; a credit risk associated with the first ownership interest; a price risk associated with the first ownership interest; a liquidity risk associated with the first ownership interest; an inflation risk associated with the first ownership interest; a currency risk associated with the first ownership interest; a Guaranteed Minimum Accumulation Benefit embedded in the first ownership interest and wherein, the first ownership interest is an ownership interest in a deferred annuity; a Guaranteed Minimum Death Benefit embedded in the first ownership interest and wherein, the first ownership interest is an ownership interest in a deferred annuity; a Guaranteed Minimum Income Benefit embedded in the first ownership interest and wherein, the first ownership interest is an ownership interest in an annuity; a Guaranteed Minimum Withdrawal Benefit embedded in the first ownership interest and wherein, the first ownership interest is an ownership interest in an annuity; or a Guaranteed Minimum Purchasing Power Benefit embedded in the first ownership interest and wherein, the first ownership interest is an ownership interest in an annuity.

The agreement between the first class of ownership interest and an other class of ownership interest can specify one category of risk (e.g., an interest rate risk associated with the first class of ownership interest) and one specified event (e.g., a qualifying surrender of an insurance policy) or it can specify more than one category of risk (e.g., an interest rate risk and a credit risk). It can specify one variety of specified event (e.g., a qualifying surrender of an insurance policy) or more than one specified event (e.g., a net withdrawal exceeding a specified amount and a conversion of a deferred annuity into an immediate annuity).

The specified event, or events, can include any variety of event. So for example, the specified event can be a qualifying surrender of an insurance contract or a withdrawal event from a stable value fund. It can be that the withdrawal event is a net withdrawal from the stable value fund or that it is a net withdrawal in excess of the market value of the assets of the stable value fund.

In some embodiments, there can be a storing, in the memory 52, of a stable value process and use of the stored process in determining at least one of the amounts, such as determining a stable value return and/or a contract value of the first class of ownership interest. Determining the amount of the at least one specified risk can include calculating the difference between contract value and market value of the first ownership interest.

Additionally, variations can be such that there are at least two other classes of ownership interest and that the at least two other classes of ownership interest are different classes of ownership interest in the same entity, or that they are classes of ownership interest in different entities. It can be that there are more than two other classes of ownership interest and that some are different classes of ownership interest in the same entity and that an other (or others) are classes of ownership interest in different entities.

In additional variations, it can be that there are at least two other classes of ownership interest and the at least one other class of ownership interest comprises at least two other classes of the ownership interest, and the first class of ownership interest is obligated to pay compensation to each of the at least two other classes of ownership interest in return for each of the at least two other classes of ownership interest incurring the risk exposure. Further, it can be that risk exposure corresponds to a respective risk exposure for each of the at least two other classes of the ownership and is within a category of risk exposure, the category specified by the agreement, and the risk exposure of each of the at least two other classes of ownership interest are in the category of risk exposure. Still further, the respective risk exposures can represent discrete tiers of risk.

Given at least two other classes of ownership interest, risk exposure can correspond to a respective risk exposure for each of the at least two other classes of the ownership and each of the respective risk exposures being in a respective category of risk exposure, the categories specified by the agreement. Further, the specified event can be within a variety of specified events, the variety specified by the agreement, and wherein each of the respective risk exposures is contingent on the variety of specified events. Still further, the specified event can be within one of a plurality of varieties of specified events, the varieties specified by the agreement, and wherein each of the respective risk exposures is contingent on a different one of the varieties of specified events.

An illustrative apparatus of an exemplary embodiment can comprise: memory 52 storing data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; a digital computer determining, by accessing the memory 52 and receiving market data corresponding to an investment associated with the first class of ownership interest, an amount of the risk exposure and an amount of the consideration; and an output device, operably associated with the computer, outputting at least one of the amounts.

The apparatus and manner of its use may further include a second computer interacting with the digital computer, in carrying out the agreement or a second computer exercising control and over said apparatus, so as to benefit from said control. For example, an entity can digitally exercise control and benefit over apparatus located distant from the entity, a computing configuration explicitly contemplated as within the scope of embodiments herein.

Any of the embodiments, implementations, or variations herein can be manifested in any such an apparatus, e.g., computer.

Illustratively, from a different perspective, there can be an apparatus comprising a digital computer programmed to carry out the operations of: storing in memory 52, operably associated with the computer, data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; determining, by accessing the memory 52 and receiving market data corresponding to an investment associated with the first class of ownership interest, an amount of the risk exposure and an amount of the consideration; and outputting, by the computer, at least one of the amounts.

From another perspective, there can be a computer readable medium storing executable instructions, which when retrieved and executed on a digital computer, causes the digital electrical computer to perform the operations of: storing in memory 52, operably associated with the computer, data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; determining, by accessing the memory 52 and receiving market data corresponding to an investment associated with the first class of ownership interest, an amount of the risk exposure and an amount of the consideration; and outputting, by the computer, at least one of the amounts. Any of the embodiments, implementations, or variations herein can be manifested in such a medium.

The medium can include at least one of a RAM, a ROM, a disk, an ASIC, and a PROM.

The embodiment presented in FIG. 7 may be implemented on at least one essentially digital processing apparatus. The processing apparatus(es) may be associated with one or more of the entities depicted in FIG. 1. If more than one processing apparatus is implementing the embodiment, the processing apparatuses may work interdependently, independently, or some combination of both, noting again the control and benefit locus embodiments.

FIG. 7 is a flow chart of an illustrative embodiment. In FIG. 7, there is a storing in memory 52 data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event 500. Determining, by a digital computer accessing the memory 52 and receiving market data corresponding to an investment associated with the first class of ownership interest, an amount of the risk exposure and an amount of the consideration 502. Outputting, by the computer, at least one of the amounts 504. Receiving data corresponding to the occurrence, and determining from the data corresponding to the occurrence whether the occurrence has occurred, and if the occurrence has occurred, determining an amount of the loss 506. Outputting, by the computer, the amount of the loss 508.

According to one aspect, all or a portion of the system, such as all or portions of the providers of stabilized value, etc. 2, purchasers of stabilized value, etc. (policyholders and/or protection buyers) 14, insurance companies 8, investment managers 20, investment bankers 4, exchanges and/or trading networks for securities 6, reporting companies (e.g., Bloomberg, Reuters, etc.) 10, brokers (e.g., securities brokers, insurance brokers, etc.) 12, rating companies (e.g., Standard & Poor, Moody's, Fitch, A. M. Best, etc.) 24, regulators (e.g., SEC, state insurance commissioners, etc.) 22, administrators (e.g., of partnerships or other entities) 18, and/or third party providers of computer services (including so-called "cloud computing" in which the programs and/or data reside on the web) 16, generally operates under control of a computer program product. The computer program product for performing the methods of embodiments includes a computer-readable storage medium, such as the non-volatile storage medium, and computer-readable program code portions, such as a series of computer instructions, embodied in the computer-readable storage medium.

In this regard, FIGS. 3, 3A, 3B, 3C, 4, 4A, 4B, 4C, 4D, 5, 6, 6A, and 7 are flowcharts of methods, systems and computer program products according to illustrative embodiments. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory (medium) that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based processing apparatuses which perform the specified functions or steps, or combinations of special purpose hardware and computer instructions.

In sum, appreciation is requested for the robust range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, it is respectfully requested that appreciation be given for the modifications that can be made based on the exemplary embodiments, implementations, and variations, without materially departing from the novel teachings and advantages herein. Accordingly, such modifications are intended to be included within the scope defined by claims. In the claims, and otherwise herein, means-plus-function language is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

Although specific terms are employed herein, they are used in a generic and descriptive sense only and not for purposes of limitation.

We claim:

1. A method of using a machine in transforming digital data into digital output data to permit use of a contract value in place of a market value on a financial statement and outputting the digital output data, the method including the operations of:

accessing, by a digital electrical computer, memory storing digital data relating to an agreement with a guarantor of a contract value of an investment, the data including
terms of the agreement, the terms including a payout of the contract value of the investment as installment payments over time, and
requirements that the installment payments be supported by both a portfolio of securities to be held in a bankruptcy-remote vehicle and by a payment guarantee of the guarantor and that the amounts and timings of the payments are to be determined in a manner to make their present value equal to the contract value at a time of a qualifying request for payout of the contract value, wherein the installment payments are subject to discounting at one or more market interest rates and adjusting for default risk; and
receiving and storing, by the digital electrical computer, digital data including market data specified in some of the stored terms of the agreement, wherein the accessing includes accessing the stored market data; and
processing, by the digital electrical computer, to transform some of said data into digital output data in determining amounts and timings for the installment payments so as to have their present value, according to the requirements, equal to the contract value; and
storing the digital output data; and
outputting, by the digital electrical computer at an output device, the digital output data comprising the determined amounts and the determined timings for the installment payments, thereby permitting use of the contract value in place of a market value.

2. The method of claim 1, wherein the terms include terms which determine a contract rate of return and the contract value; and further including, on a regular basis:
receiving and storing digital data including market data specified in those of the stored terms which determine the contract rate of return;
determining, according to the stored terms, an amount of the contract rate of return and an amount of the contract value; and
storing and outputting at least one of the determined amount of the contract rate of return and the determined amount of the contract value.

3. The method of claim 1, wherein:
the investment is a life insurance policy,
the contract value is a cash surrender value of the policy,
the qualifying request for payout at contract value is a qualifying request for a surrender of the policy, and
the bankruptcy-remote vehicle is a separate account of an insurance company.

4. The method of claim 1, wherein the terms include at least one requirement regarding characteristics of component securities of the portfolio, and further including:
receiving and storing securities data;
identifying, from the stored securities data, each of the component securities and their respective amounts for the portfolio of securities in accordance with the requirements; and
storing and outputting each of the identities of the component securities and their respective amounts.

5. The method of claim 4, wherein the identifying includes identifying the component securities and their respective amounts that provide, in the absence of a default, a set of cash flows over time sufficient to pay the determined amounts of the installment payments at the determined times.

6. The method of claim 5, further including receiving and storing Treasury interest rates; and wherein the determining of the amounts and timings of the installment payments is carried out with the adjusting for the default risk including adjusting initial amounts of the installment payments for joint cumulative probability of default of the portfolio of securities and of the guarantor; and the discounting includes discounting the adjusted initial amounts by one or more of the Treasury interest rates.

7. The method of claim 6, further including:

receiving and storing credit spread data; and wherein the adjusting the initial amounts includes adjusting the initial amounts by using the credit spread data.

8. The method of claim 6, further including:

receiving and storing historical default rates, and wherein the adjusting the initial amounts includes adjusting the initial amounts by using the historical default rates.

9. The method of claim 8, further including:

receiving and storing credit agency rating data, and wherein the adjusting the initial amounts includes adjusting the initial amounts by using historical joint cumulative probability of default according to the credit agency rating data.

10. The method of claim 4, further including:

storing a measure of loss exposure for the guarantor; and wherein the determining of the amounts and timings of the installment payments and the identifying of the component securities and their respective amounts are carried out by iterative processing using the measure of loss exposure so as to produce a minimization of the measure of loss exposure for the guarantor; and further including storing and outputting the determined minimum of the measure of loss exposure.

11. The method of claim 10, further including:

storing a measure of fair value of the agreement for the guarantor; and wherein the determining of the amounts and timings of the installment payments and the identifying of the component securities and their respective amounts are carried out by hypothetical determining by applying the determined minimization to determine an amount of the fair value; and further including storing and outputting the determined amount of the fair value.

12. The method of claim 11, wherein the determining, storing and outputting of the amount of the fair value occurs on a periodic basis.

13. The method of claim 11, further including:

storing a requirement for determining an amount of the fair value given the occurrence of at least one specified event; and further including monitoring to determine whether the at least one specified event has occurred and, if the at least one specified event is determined to have occurred, determining, storing and outputting the amount of the fair value.

14. The method of claim 10, wherein the measure of loss exposure is computed as a function of variables including an amount of cash that the guarantor contributes to purchase of the portfolio and expected default losses on the component securities.

15. The method of claim 14 wherein the processing to produce the minimization includes:

determining a minimum cash contribution amount by the guarantor to the purchase of the portfolio and storing the determined minimum cash contribution amount; and the identifying of the component securities and their respective amounts is carried out so as to minimize expected default losses of the component securities subject to a constraint that the amount of cash that the guarantor contributes to the purchase of the portfolio is not greater than the determined minimum cash contribution amount.

16. The method of claim 14, further including:

storing terms for determining an interest rate for discounting expected default losses on the component securities; and determining an amount of said interest rate for the discounting of the expected default losses; and wherein the measure of loss exposure is the sum of the amount of cash that the guarantor contributes to purchase of the portfolio and the present value of expected default losses on the component securities.

17. The method of claim 14, further including receiving and storing a regulatory capital requirement of the guarantor; and wherein the measure of loss exposure is computed so as to be compliant with the regulatory capital requirement.

18. The method of claim 14, further including receiving and storing a cost of capital of the guarantor, and wherein the measure of loss exposure is computed to reflect the cost of capital of the guarantor.

19. The method of claim 11, further including storing a measure of probability of receiving the qualifying request for the payout of the contract value, and determining an amount of the probability, and using the amount of the probability in determining the amount of the fair value.

20. The method of claim 19, wherein:

the investment is a life insurance policy, the contract value is a cash surrender value of the policy, the qualifying request for payout at contract value is a qualifying request for a surrender of the policy, and the bankruptcy-remote vehicle is a separate account of an insurance company; and further including receiving and storing a regulatory capital requirement of a policyholder for the policy; and wherein the amount of the fair value is computed to reflect an impact of the regulatory capital requirement on the determined amount of the probability of the qualifying request for payout at the cash surrender value.

21. The method of claim 19, further including:

receiving and storing an identity of a beneficiary of the agreement; and receiving and storing a regulatory capital requirement of said beneficiary; and wherein the amount of the fair value is computed to reflect an impact of the regulatory capital requirement of said beneficiary on the determined amount of the probability of the qualifying request for payout at the contract value.

22. The method of claim 1, wherein the determining of the installment payments is carried out with the discounting including discounting the installment payments at only one said market interest rate.

23. The method of claim 1, wherein the determining of the installment payments is carried out with the discounting including discounting the installment payments at more than one of said market interest rates.

24. The method of claim 1, wherein:
the terms include an option for the guarantor to prepay any remaining installment payments at their amortized cost; and further including
determining an amount of the amortized cost; and
storing and outputting the amount of the amortized cost.

25. The method of claim 1, wherein the digital data includes an amount of the contract value.

26. The method of claim 1, wherein the digital data indicates that the guarantor is a class of ownership interest in an entity.

27. The method of claim 1, where the digital data indicates that the guarantor is a superstructure pool.

28. The method of claim 2, wherein:
the terms include terms specifying use of a built-up moving average of yield-to-worst of the investment in determining the amount of the contract rate of return; and further including:
calculating an amount of the built-up moving average of the yield-to-worst; and
using the amount of the built-up moving average in determining the amount of the contract rate of return.

29. The method of claim 2, wherein:
the terms include terms specifying determination of a variable adjustment speed factor; and further including:
calculating an amount of the variable adjustment speed factor; and
using the amount of the variable adjustment speed in determining the amount of the contract rate of return.

30. The method of claim 2, wherein:
the terms include terms specifying a minimum allowable ratio of the market value of the investment to the contract value of the investment; and further including:
calculating an amount of difference between a ratio of the market value to the contract value and the minimum allowable ratio of the market value to the contract value; and
using the amount of the difference in the determining of the amount of the contract rate of return.

31. The method of claim 2, wherein:
the terms include terms specifying determining of an adjustment factor EF that fully amortizes an enhancement amount EA over a period of time specified in the terms;
the EA is amortized relative to the market value of the investment;
the determining the adjustment factor EF includes determining an amount of the EF and an amortization of the EA relative to the market value; and
the determining of the amount of the contract rate of return uses the amount of the EF and the amortization of EA in determining the amount of the contract rate of return.

32. The method of claim 31, wherein the determining of the amount of the contract rate of return includes multiplying by a factor equal to $(1-EF)$.

33. The method of claim 31, wherein:
the determining the EF includes calculating $EF=1-1/(1+EA0/MV0))^{(1/N)}$, wherein EA0 is an initial enhancement amount;
MV0 is an initial market value of the investment; and
N is an amortization period in years.

34. The method of claim 33, wherein:
the determining of the amortization schedule includes calculating $EAt/MVt=((MV0+EA0)/MV0)*(1-EF)^t-1$; and
EAt/MVt is a ratio of EA/MV at time t and t is time in years.

35. The method of claim 2, wherein:
the terms include a requirement for at least one partial allocation of the investment to at least one money market fund or short-duration investment fund given an occurrence of at least one specified event; and further including:
monitoring whether the at least one specified event has occurred and, if the at least one specified event has occurred:
determining an amount of the at least one partial allocation, and
storing and outputting the amount for the at least one partial allocation.

36. The method of claim 4, wherein:
the stored terms include requirements for minimum amounts of call protection for the component securities; and
the identifying of the component securities includes identifying component securities with call protection equal to or greater than the required minimum amounts of call protection.

37. The method of claim 36, wherein:
the identifying of the component securities includes determining actual amounts of call protection associated with securities that are candidates considered for selection as the component securities of the portfolio.

38. The method of claim 21, wherein:
the terms of the agreement permit the guarantor to use regulatory capital requirements of the beneficiary as a factor in identifying component securities of the portfolio; and
the identifying of the component securities of the portfolio and their respective amounts includes determining a regulatory capital impact of the securities that are candidates considered for selection as the component securities of the portfolio.

39. The method of claim 14, further including:
receiving and storing an amount of an interest rate for discounting the expected default losses on the component securities; and wherein
the measure of the loss exposure is a sum of an amount of cash that the guarantor contributes to purchase the component securities and a present value of expected default losses on the component securities.

40. The method of claim 39, wherein said interest rate discounting the expected default losses is the cost of capital of the guarantor.

41. The method of claim 2, wherein:
the terms include terms specifying use of a measure of variability of return of the investment in determining the amount of the contract rate of return, the contract value, or both, and the amount of the measure of variability changes over time; and further including
calculating an amount of the measure of the variability of return.

42. The method of claim 41, wherein the measure of the variability of return on the investment is a standard deviation of a return on the investment calculated over a specified time period.

49

43. The method of claim 29, wherein:
the calculating of the amount of the variable adjustment speed includes using a measure of an amount of variability of a return on the investment; and
the amount of the measure of the variability changes over time.

44. The method of claim 19, further including:
receiving and storing an identity of a beneficiary of the agreement;
determining, by using tax preparation software, a tax liability for the beneficiary in event of the qualifying request for the installment payment payout at the contract value; and
determining a probability of the qualifying request for the installment payment payout at the contract value by using the determined amount of tax liability of the beneficiary upon the installment payment payout at the contract value.

45. The method of claim 10, further including:
receiving and storing terms of at least one agreement between the guarantor and at least one insurer regarding an amount of insurance against the default risk, wherein the default risk includes the default risk of the portfolio or one or more component securities of the portfolio;
receiving and storing data including market data specified in some terms of the stored at least one agreement between the guarantor and said at least one insurer;
determining an amount at least one amount of insurance to be purchased from each said insurer and a cost of said insurance, and wherein said at least one amount of the insurance is used in the iterative processing which produces the minimization of the measure of the loss exposure; and
storing and outputting the at least one amount of the insurance to be purchased and the cost of said insurance.

46. The method of claim 45, wherein:
the at least one agreement comprises at least one credit default swap, to which said at least one insurer as at least one counterparty to the at least one credit default swap;
the amount of the insurance to be purchased is a notional amount of the credit default swap agreement; and
the cost of said insurance is a cost of said credit default swap.

47. A method of operating a computer in transforming digital data into digital output data, the method including the operations of:
providing a digital electrical computer with a data base including terms of the agreement, the terms including a payout of the contract value of the investment as installment payments over time, and
requirements that the installment payments be supported by both a portfolio of securities to be held in a bankruptcy-remote vehicle and by a payment guarantee of the guarantor and that the amounts and timings of the payments are to be determined in a manner to make their present value equal to the contract value at a time of a qualifying request for payout of the contract value, wherein the installment payments are subject to discounting at one or more market interest rates and adjusting for default risk; and
receiving, by the digital electrical computer, digital data including market data specified in some of the terms of the agreement; and
initiating processing, by the digital electrical computer, to transform some of said data into digital output data in determining amounts and timings for the installment payments so as to have their present value, according to the requirements, equal to the contract value; and
outputting in a display, by the digital electrical computer at an output display device, the digital output data comprising the determined amounts and the determined timings for the installment payments.

48. A machine configured to transform digital data into digital output data to permit use of a contract value in place of a market value on a financial statement and outputting the digital output data, the machine comprising:
a digital computer system comprising a digital computer operably associated with an output device and a memory tangibly storing instructions which are executed, enabling the computer system to perform the operations of:
accessing memory storing digital data relating to an agreement with a guarantor of a contract value of an investment, the data including
terms of the agreement, the terms including a payout of the contract value of the investment as installment payments over time, and
requirements that the installment payments be supported by both a portfolio of securities to be held in a bankruptcy-remote vehicle and by a payment guarantee of the guarantor and that the amounts and timings of the payments are to be determined in a manner to make their present value equal to the contract value at a time of a qualifying request for payout of the contract value, wherein the installment payments are subject to discounting at one or more market interest rates and adjusting for default risk; and
receiving and storing digital data including market data specified in some of the stored terms of the agreement, wherein the accessing includes accessing the stored market data; and
processing to transform some of said data into digital output data in determining amounts and timings for the installment payments so as to have their present value, according to the requirements, equal to the contract value; and then
outputting at the output device, the digital output data comprising the determined amounts and the determined timings for the installment payments, thereby permitting use of the contract value in place of a market value.

49. The machine of claim 48, wherein the terms include terms which determine a contract rate of return and the contract value; and wherein the operations further include, on a regular basis:
receiving and storing digital data including market data specified in those of the terms which determine the contract rate of return;
determining, according to the stored terms, an amount of the contract rate of return and an amount of the contract value; and
storing and outputting at least one of the determined amount of the contract rate of return and the determined amount of the contract value.

50. The machine of claim 48, wherein:
the investment is a life insurance policy,
the contract value is a cash surrender value of the policy,
the qualifying request for payout at contract value is a qualifying request for a surrender of the policy, and
the bankruptcy-remote vehicle is a separate account of an insurance company.

51. The machine of claim 48, wherein the terms include at least one requirement regarding characteristics of component securities of the portfolio, and wherein the operations further include:
  receiving and storing securities data;
  identifying, from the stored securities data, each of the component securities and their respective amounts for the portfolio of securities in accordance with the requirements; and
  storing and outputting each of the identities of the component securities and their respective amounts.

52. The machine of claim 51, wherein the identifying includes identifying the component securities and their respective amounts that provide, in the absence of a default, a set of cash flows over time sufficient to pay the determined amounts of the installment payments at the determined times.

53. The machine of claim 52, wherein the operations include receiving and storing Treasury interest rates, and wherein
  the determining of the amounts and timings of the installment payments is carried out with the adjusting for the default risk including adjusting initial amounts of the installment payments for joint cumulative probability of default of the portfolio of securities and of the guarantor; and
  the discounting includes discounting the adjusted initial amounts by one or more of the Treasury interest rates.

54. The machine of claim 53, wherein the operations further include:
  receiving and storing credit spread data; and wherein
  the adjusting the initial amounts includes adjusting the initial amounts by using the credit spread data.

55. The machine of claim 53, wherein the operations further include:
  receiving and storing historical default rates, and wherein
  the adjusting the initial amounts includes adjusting the initial amounts by using the historical default rates.

56. The machine of claim 55, wherein the operations further include:
  receiving and storing credit agency rating data, and wherein
  the adjusting the initial amounts includes adjusting the initial amounts by using historical joint cumulative probability of default according to the credit agency rating data.

57. The machine of claim 51, wherein the operations further include:
  storing a measure of loss exposure for the guarantor; and wherein
  the determining of the amounts and timings of the installment payments and the identifying of the component securities and their respective amounts are carried out by iterative processing using the measure of loss exposure so as to produce a minimization of the measure of loss exposure for the guarantor; and
  further including storing and outputting the determined minimum of the measure of loss exposure.

58. The machine of claim 57, wherein the operations further include:
  storing a measure of fair value of the agreement for the guarantor; and wherein
  the determining of the amounts and timings of the installment payments and the identifying of the component securities and their respective amounts are carried out by hypothetical determining by applying the determined minimization to determine an amount of the fair value; and wherein the operations further include:
  storing and outputting the determined amount of the fair value.

59. The machine of claim 58, wherein the determining, storing and outputting of the amount of the fair value occurs on a periodic basis.

60. The machine of claim 58, wherein the operations include:
  storing a requirement for determining an amount of the fair value given the occurrence of at least one specified event; and
  wherein the operations further include monitoring to determine whether the at least one specified event has occurred and, if the at least one specified event is determined to have occurred, determining, storing and outputting the amount of the fair value.

61. The machine of claim 57, wherein the measure of loss exposure is computed as a function of variables including an amount of cash that the guarantor contributes to purchase of the portfolio and expected default losses on the component securities.

62. The machine of claim 61, wherein the processing to produce the minimization includes:
  determining a minimum cash contribution amount by the guarantor to the purchase of the portfolio and storing the determined minimum cash contribution amount; and
  the identifying of the component securities and their respective amounts is carried out so as to minimize expected default losses of the component securities subject to a constraint that the amount of cash that the guarantor contributes to the purchase of the portfolio is not greater than the determined minimum cash contribution amount.

63. The machine of claim 61, wherein the operations further include:
  storing terms for determining an interest rate for discounting expected default losses on the component securities; and
  determining an amount of said interest rate for the discounting of the expected default losses; and wherein
  the measure of loss exposure is the sum of the amount of cash that the guarantor contributes to purchase of the portfolio and the present value of expected default losses on the component securities.

64. The machine of claim 61, wherein the operations further include:
  receiving and storing a regulatory capital requirement of the guarantor; and wherein
  the measure of loss exposure is computed so as to be compliant with the regulatory capital requirement.

65. The machine of claim 61, wherein the operations further include:
  receiving and storing a cost of capital of the guarantor, and wherein
  the measure of loss exposure is computed to reflect the cost of capital of the guarantor.

66. The machine of claim 61, wherein the operations further include:
  storing a measure of probability of receiving the qualifying request for the payout of the contract value, and
  determining an amount of the probability, and using the amount of the probability in determining the amount of the fair value.

67. The machine of claim 66, wherein:
  the investment is a life insurance policy,
  the contract value is a cash surrender value of the policy,
  the qualifying request for payout at contract value is a qualifying request for a surrender of the policy, and the bankruptcy-remote vehicle is a separate account of an insurance company; and wherein the operations further include:
receiving and storing a regulatory capital requirement of a policyholder for the policy; and wherein
the amount of the fair value is computed to reflect an impact of the regulatory capital requirement on the determined amount of the probability of the qualifying request for payout at the cash surrender value.

68. The machine of claim 66, wherein the operations further include:
receiving and storing an identity of a beneficiary of the agreement; and
receiving and storing a regulatory capital requirement of said beneficiary; and wherein
the amount of the fair value is computed to reflect an impact of the regulatory capital requirement of said beneficiary on the determined amount of the probability of the qualifying request for payout at the contract value.

69. The machine of claim 48, wherein the determining of the installment payments is carried out with the discounting including discounting the installment payments at only one said market interest rate.

70. The machine of claim 48, wherein the determining of the installment payments is carried out with the discounting including discounting the installment payments at more than one of said market interest rates.

71. The machine of claim 48, wherein:
the terms include an option for the guarantor to prepay any remaining installment payments at their amortized cost; and wherein the operations further include:
determining an amount of the amortized cost; and
storing and outputting the amount of the amortized cost.

72. The machine of claim 48, wherein the digital data includes an amount of the contract value.

73. The machine of claim 48, wherein the digital data indicates that the guarantor is a class of ownership interest in an entity.

74. The machine of claim 48, where the digital data indicates that the guarantor is a superstructure pool.

75. The machine of claim 49, wherein:
the terms include terms specifying use of a built-up moving average of yield-to-worst of the investment in determining the amount of the contract rate of return; and wherein the operations further include:
calculating an amount of the built-up moving average of the yield-to-worst; and
using the amount of the built-up moving average in determining the amount of the contract rate of return.

76. The machine of claim 49, wherein:
the terms include terms specifying determination of a variable adjustment speed factor; and wherein the operations further include:
calculating an amount of the variable adjustment speed factor; and
using the amount of the variable adjustment speed in determining the amount of the contract rate of return.

77. The machine of claim 49, wherein:
the terms include terms specifying a minimum allowable ratio of the market value of the investment to the contract value of the investment; and wherein the operations further include:
calculating an amount of difference between a ratio of the market value to the contract value and the minimum allowable ratio of the market value to the contract value; and
using the amount of the difference in the determining of the amount of the contract rate of return.

78. The machine of claim 49, wherein:
the terms include terms specifying determining of an adjustment factor EF that fully amortizes an enhancement amount EA over a period of time specified in the terms;
the EA is amortized relative to the market value of the investment;
the determining the adjustment factor EF includes determining an amount of the EF and an amortization of the EA relative to the market value; and
the determining of the amount of the contract rate of return uses the amount of the EF and the amortization of EA in determining the amount of the contract rate of return.

79. The machine of claim 78, wherein the determining of the amount of the contract rate of return includes multiplying by a factor equal to $(1-EF)$.

80. The machine of claim 78, wherein:
the determining the EF includes calculating $EF=1-1/(1+EA0/MV0))^{(1/N)}$, wherein EA0 is an initial enhancement amount;
MV0 is an initial market value of the investment; and
N is an amortization period in years.

81. The machine of claim 80, wherein:
the determining of the amortization schedule includes calculating $EAt/MVt=((MV0+EA0)/MV0)*(1-EF)^{t}-1$; and
EAt/MVt is a ratio of EA/MV at time t and t is time in years.

82. The machine of claim 49, wherein:
the terms include a requirement for at least one partial allocation of the investment to at least one money market fund or short-duration investment fund given an occurrence of at least one specified event; and wherein the operations further include:
monitoring whether the at least one specified event has occurred and, if the at least one specified event has occurred:
determining an amount of the at least one partial allocation, and
storing and outputting the amount for the at least one partial allocation.

83. The machine of claim 51, wherein:
the stored terms include requirements for minimum amounts of call protection for the component securities; and
the identifying of the component securities includes identifying component securities with call protection equal to or greater than the required minimum amounts of call protection.

84. The machine of claim 83, wherein:
the identifying of the component securities includes determining actual amounts of call protection associated with securities that are candidates considered for selection as the component securities of the portfolio.

85. The machine of claim 68, wherein:
the terms of the agreement permit the guarantor to use regulatory capital requirements of the beneficiary as a factor in identifying component securities of the portfolio; and
the identifying of the component securities of the portfolio and their respective amounts includes determining a regulatory capital impact of the securities that are candidates considered for selection as the component securities of the portfolio.

86. The machine of claim 61, wherein the operations further include:
receiving and storing an amount of an interest rate for discounting the expected default losses on the component securities; and wherein
the measure of the loss exposure is a sum of an amount of cash that the guarantor contributes to purchase the component securities and a present value of expected default losses on the component securities.

87. The machine of claim 86, wherein said interest rate discounting the expected default losses is the cost of capital of the guarantor.

88. The machine of claim 49, wherein:
the terms include terms specifying use of a measure of variability of return of the investment in determining the amount of the contract rate of return, the contract value, or both, and the amount of the measure of variability changes over time; and wherein the operations further include:
calculating an amount of the measure of the variability of return.

89. The machine of claim 88, wherein the measure of the variability of return on the investment is a standard deviation of a return on the investment calculated over a specified time period.

90. The machine of claim 76, wherein:
the calculating of the amount of the variable adjustment speed includes using a measure of an amount of variability of a return on the investment; and
the amount of the measure of the variability changes over time.

91. The machine of claim 66, wherein the operations further include:
receiving and storing an identity of a beneficiary of the agreement;
determining, by using tax preparation software, a tax liability for the beneficiary in event of the qualifying request for the installment payment payout at the contract value; and
determining a probability of the qualifying request for the installment payment payout at the contract value by using the determined amount of tax liability of the beneficiary upon the installment payment payout at the contract value.

92. The machine of claim 57, wherein the operations further include:
receiving and storing terms of at least one agreement between the guarantor and at least one insurer regarding an amount of insurance against the default risk, wherein the default risk includes the default risk of the portfolio or one or more component securities of the portfolio;
receiving and storing data including market data specified in some terms of the stored at least one agreement between the guarantor and said at least one insurer;
determining an amount at least one amount of insurance to be purchased from each said insurer and a cost of said insurance, and wherein said at least one amount of the insurance is used in the iterative processing which produces the minimization of the measure of the loss exposure; and
storing and outputting the at least one amount of the insurance to be purchased and the cost of said insurance.

93. The machine of claim 92, wherein:
the at least one agreement comprises at least one credit default swap, to which said at least one insurer is at least one counterparty to the at least one credit default swap;
the amount of the insurance to be purchased is a notional amount of the credit default swap agreement; and
the cost of said insurance is a cost of said credit default swap.

\* \* \* \* \*